(12) United States Patent
Winter et al.

(10) Patent No.: US 11,180,402 B1
(45) Date of Patent: Nov. 23, 2021

(54) MOBILE WATER FILTRATION SYSTEM

(71) Applicant: COKEBUSTERS USA INC., Houston, TX (US)

(72) Inventors: Gary Winter, Houston, TX (US); Shrinivas Peri, Spring, TX (US)

(73) Assignee: COKEBUSTERS USA INC., Houston, TX (US)

( * ) Notice: Subject to any disclaimer, the term of this patent is extended or adjusted under 35 U.S.C. 154(b) by 0 days.

(21) Appl. No.: 17/333,375

(22) Filed: May 28, 2021

Related U.S. Application Data

(63) Continuation of application No. PCT/US2020/051152, filed on Sep. 17, 2020.

(51) Int. Cl.
*C02F 9/00* (2006.01)
*C02F 1/00* (2006.01)
*C02F 103/36* (2006.01)
*C02F 1/52* (2006.01)

(52) U.S. Cl.
CPC ............... *C02F 9/00* (2013.01); *C02F 1/004* (2013.01); *C02F 1/5209* (2013.01); *C02F 2103/365* (2013.01); *C02F 2201/005* (2013.01); *C02F 2201/008* (2013.01); *C02F 2209/006* (2013.01); *C02F 2209/03* (2013.01); *C02F 2209/40* (2013.01); *C02F 2301/08* (2013.01)

(58) Field of Classification Search
None
See application file for complete search history.

(56) References Cited

U.S. PATENT DOCUMENTS

| | | |
|---|---|---|
| 5,411,665 A | 5/1995 | Scraggs et al. |
| 5,946,767 A | 9/1999 | Sinz |

(Continued)

FOREIGN PATENT DOCUMENTS

CN    205019812 U    2/2016

OTHER PUBLICATIONS

PCT International Search Report of the International Search Authority (USPTO) for PCT International Application PCT/US2020/051152, filed on Sep. 17, 2020, dated Dec. 15, 2020.

(Continued)

*Primary Examiner* — Richard C Gurtowski
(74) *Attorney, Agent, or Firm* — Basil Michael Angelo; Angelo IP

(57) ABSTRACT

Mobile water filtration enables on-site recycling of wastewater for reuse in mechanical decoking operations of fired-heaters, furnaces, boilers, or systems prone to build up of deposits, residue, or scale and enables on-site disposal of wastewater in a safe and environmentally conscious manner. In batch operations, a coagulant, a flocculant, and a plurality of cascaded filters of increasingly fine pitch may be used to treat wastewater and remove particulate matter, such as, for example, coke, for reuse or safe disposal. In continuous operations, a plurality of cascaded filters of increasingly fine pitch may be used. A control system may be used to automate the operation of a mobile water filtration system for use with a decoking system, such that it does not require human intervention exception for maintenance operations related to filters. The filtered water may be disposed of on-site, eliminating the need for further treatment or transport off site.

12 Claims, 17 Drawing Sheets

(56) References Cited

U.S. PATENT DOCUMENTS

| | | | |
|---|---|---|---|
| 2005/0139530 A1* | 6/2005 | Heiss | C02F 9/00 |
| | | | 210/85 |
| 2014/0076707 A1* | 3/2014 | Gast | C10B 39/06 |
| | | | 201/3 |
| 2014/0124441 A1* | 5/2014 | Ikeda | B01D 65/02 |
| | | | 210/636 |
| 2014/0199453 A1 | 7/2014 | Deweese | |
| 2014/0263079 A1 | 9/2014 | McCurdy | |
| 2017/0233275 A1 | 8/2017 | Segroves et al. | |
| 2019/0047875 A1 | 2/2019 | Lu | |

OTHER PUBLICATIONS

PCT Written Opinion of the International Search Authority (USPTO) for PCT International Application PCT/US2020/051152, filed on Sep. 17, 2020, dated Dec. 15, 2020.

PCT International Search Report for PCT International Application PCT/US2020/051152, filed on Sep. 17, 2020, dated Dec. 15, 2020.

* cited by examiner

MOBILE WATER FILTRATION SYSTEM

CROSS-REFERENCE TO RELATED APPLICATIONS

This application is a continuation of PCT International Application PCT/US2020/051152, filed on Sep. 17, 2020, which is hereby incorporated by reference in its entirety for all purposes.

BACKGROUND OF THE INVENTION

Raw coke is a product or byproduct that is created by heating coal or crude oil in the absence of air. While the resulting composition may vary based on the feedstock, raw coke is a carbon-rich material with little to no entrained gas that may be further processed into an industrial fuel or raw material for other manufacturing processes. In refinery coking operations, residual oils, sometimes referred to as bottoms from the atmospheric or vacuum distillation columns, are intentionally converted into petroleum coke and byproducts by a coking process that thermally splits the long chain hydrocarbons of the feedstock into shorter chain hydrocarbons. However, it is the unintentional creation of coke as a residue or scale in fired heaters and boilers that is problematic to the ongoing operation of the fired heater or boiler.

A fired heater is typically a direct-fired heat exchanger that raises the temperature of fluids flowing through one or more tubular coils disposed therein. In refinery applications, fired heaters are used in the crude distillation and vacuum distillation columns. When oil flows through the tubes of the heater, the oil starts to vaporize and asphaltenes precipitate out, forming a coke residue. As coke deposits builds up on the inside of the tubes, the coke burns intensely, raising the temperature and creating a hot spot within the heater. Consequently, the temperature of the fired heater must be reduced to compensate for the heat contribution of the hot spots, otherwise the metal temperatures of the tubes will increase to a metallurgical limit and damage the system. When coke deposits build up, the fired heater must be shut down and the tubes must be decoked to remove the residue or scale from within their lumen, thereby restoring the capability of the fired heater to achieve the required temperature for proper operation. While there are several factors that influence the formation of coke, some of which may be mitigated to some extent, the formation of coke is unavoidable and fired heaters and boilers require removal of coke deposits as a regular part of maintenance operations.

BRIEF SUMMARY OF THE INVENTION

According to one aspect of one or more embodiments of the present invention, a method of mobile water filtration for on-site decoking operations includes monitoring a fluid volume of a first tank and a fluid volume of a second tank, if the fluid volume of the first tank is less than a first predetermined volume, starting a first pumping system to fluidly communicate fluids from an inlet connector to the first pumping system, a first filtration system, and the first tank and stopping a second pumping system, if the fluid volume of the first tank reaches a second predetermined volume, fluidly communicating a predetermined volume of coagulant into the first tank, if the fluid volume of the first tank reaches a third predetermined volume, fluidly communicating a predetermined volume of flocculant into the first tank, pausing for a predetermined amount of time to allow the first tank to settle, and starting the second pumping system to fluidly communicate fluids from the first tank to a second filtration system and the second tank, if the fluid volume of the second tank reaches a fourth predetermined volume, starting a third pumping system to fluidly communicate fluids from the second tank to a third filtration system, a fourth filtration, and an outlet connector, and if the fluid volume of the second tank reaches a fifth predetermined volume, stopping the second pumping system.

According to one aspect of one or more embodiments of the present invention, a mobile water filtration system for on-site decoking operations includes a mobile trailer having an inlet connector and an outlet connector. The system further includes a first pumping system, a first filtration system, and a first tank disposed in the mobile trailer, where the inlet connector is fluidly connected to an inlet of the first pumping system, an outlet of the first pumping system is fluidly connected to an inlet of the first filtration system, and an outlet of the first filtration system is fluidly connected to an inlet of the first tank. The system further includes a second pumping system, a second filtration system, and a second tank disposed in the mobile trailer, where an outlet of the first tank is fluidly connected to an inlet of the second pumping system, an outlet of the second pumping system is fluidly connected to an inlet of the second filtration system, and an outlet of the second filtration system is fluidly connected to an inlet of the second tank. The system further includes a third pumping system, a third filtration system, and a fourth filtration system disposed in the mobile trailer, where an outlet of the second tank is fluidly connected to an inlet of the third pumping system, an outlet of the third pumping system is fluidly connected to an inlet of the third filtration system, an outlet of the third filtration system is fluidly connected to an inlet of the fourth filtration system, and an outlet of the fourth filtration system is fluidly connected to the outlet connector. A control system that controls a pump speed of the first pumping system, the second pumping system, and the third pumping system.

Other aspects of the present invention will be apparent from the following description and claims.

DETAILED DESCRIPTION OF THE INVENTION

Figure 1:
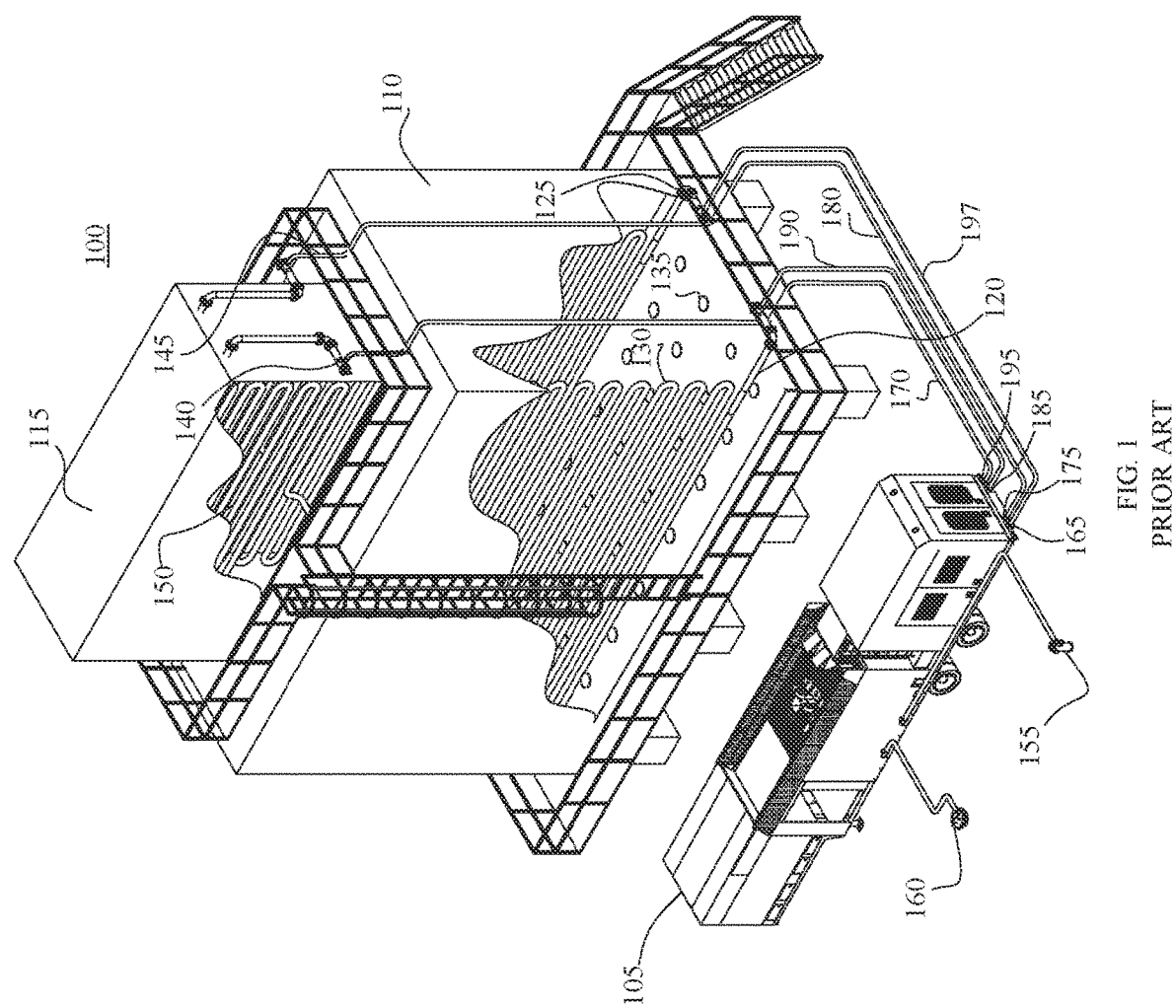
FIG. 1 shows a conventional fired heater connected to a mobile decoking system.

One or more embodiments of the present invention are described in detail with reference to the accompanying figures. For consistency, like elements in the various figures are denoted by like reference numerals. In the following detailed description of the present invention, specific details are set forth to provide a thorough understanding of the present invention. In other instances, well-known features to those of ordinary skill in the art are not described to avoid obscuring the description of the present invention.

Decoking is the process of removing undesired coke deposits from within the lumen of the tubular coil or coils of fired heaters or boilers. While there are a number of methods to decoke a fired heater or boiler, the means and effectiveness of the methods vary. The steam-air decoking method uses a mixture of steam, air, and heat to shrink and crack the coke deposits. The steam and air mixture passes through the coke deposits inside the tubes while the tubes are heated externally. While this method is somewhat effective for the radiant tubes, it is largely ineffective at removing coke deposits from within the convection tubes. If the steam-air method fails, it may become necessary to dismantle the tubing in an expensive, time consuming, and potentially destructive method of cleaning. Another disadvantage to the steam-air method is that the chemical reaction between steam, air, and the coke deposits produces gases such as CO, $CO_2$, and $H_2$ that must be vented to the atmosphere and are considered bad for the environment.

The inline-spalling decoking method is unique in that it is the only decoking method that may be carried out while the fired heater remains in service. One furnace at a time may be treated while the others remain in operation. The inline-spalling method passes high velocity steam, which is alternately heated and cooled, through the tubes delivering thermal shocks to spall coke deposits off the walls of the tubes. While the inline spalling method is more environmentally friendly than the steam-air method, additional decoking may be required since the inline-spalling method is well known to not fully decoke the radiant tubes and is also largely ineffective at removing coke deposits from within the convection tubes. Another disadvantage to the inline-spalling decoking method is that the tubes are prone to damage from repeated contraction and expansion during spalling. The chemical decoking method circulates a chemical cleaner, usually an acid, through the tubes until the coke deposits have been sufficiently loosened for removal. The tubes are then flushed with water to remove the deposits from within the coil. During the flushing process, the chloride content of the water must be closely monitored, otherwise the inner walls of the tubes may be prone to corrosion. Another disadvantage to the chemical decoking method is that the chemicals used to decoke the tubes are not environmentally friendly, so they must be captured and disposed of in accordance with environmental regulations, which further increases decoking costs.

Mechanical decoking has proven to be the most effective method of removing coke deposits from within the tubes of fired heaters or boilers. Mechanical pigs are propelled through each tubular coil, typically from end to end, to dislodge and remove coke deposits from inside the tubes. While a variety of mechanical pigs are commercially available, studded pigs have proven effective at removing coke deposits. A mobile pumping unit propels one or more pigs through the tubes in a bi-directional manner to remove coke deposits in a wire-brush like manner. In addition, these pigs are capable of navigating plug headers easily without modification to the tubes. As such, mechanical decoking has proven more effective at removing coke deposits and advantageously does not vent gases to the atmosphere, does not expose the tubes to repeated contraction and expansion, and does not require the use of acids or chemicals that require reclamation. In addition, mechanical decoking is a faster cleaning process that provides comparatively longer run lengths with respect to other cleaning processes.

FIG. 1 shows a conventional fired heater 100 connected to a mobile decoking system 105 for mechanical decoking operations. While a fired heater 100 is shown for purposes of illustration only, one of ordinary skill in the art will appreciate that the discussion that follows applies to any type or kind of system, including fired heaters, furnaces, boilers, and any other system that use tubulars subject to the buildup of residue or scale. The exemplary fired heater 100 may include a radiant heating chamber 110 and a convection heating area 115. During refinery operations, the radiant heating chamber 110 may be used to process fluids (not shown) that are fluidly communicated from the radiant tubing inlet 120 to the radiant tubing outlet 125 via a tubular coil 130 comprised of a plurality of radiant tubes (not independently labeled). A plurality of fired burners 135 or other heating elements may be disposed within the radiant heating chamber 110, providing radiant heat to the process fluids (not shown) as they traverse the tubular coil 130. Similarly, the convection heating area 115 may be used to process fluids (not shown) that are communicated from the convection tubing inlet 140 to the convection tubing outlet 145 via a tubular coil 150 comprised of a plurality of convection tubes (not independently labeled). Convection may be used to heat the process fluids (not shown) traversing the tubular coil 150 of convection tubes.

As coke residue builds up within the lumen, or interior passageway, of one or more of tubular coils 130 or 150, the deposits burn intensely, raising the temperature at that location and creating a hot spot (not shown) within the fired heater 100. Consequently, the temperature of the fired heater 100 must be reduced in view of the heat contribution of the hot spots, to prevent the temperature of the metal tubes 130 or 150 from increasing to, or exceeding, their metallurgical limit. Once sufficient deposits have built up, the fired heater 100 must be shut down and decoking operations must be performed to dislodge and flush the coke deposits from within the tubes 130 or 150, thereby restoring the capability of the fired heater 100 to achieve the required temperature for proper operation A mobile decoking system 105, such as that commercially offered by Cokebusters® USA Inc., of Houston, Tex., may be disposed on-site of the fired heater 100 to mechanically decoke the radiant tubes 130 and/or convection tubes 150. The mobile decoking system 105 may include a source water inlet 155 to a clean water tank (not shown) that receives source water (not shown) that may be provided on-site by the operator of the fired heater 100 and a wastewater outlet 160 that outputs wastewater (not shown) produced by the mechanical decoking process, the disposal of which is discussed in more detail herein, from the dirty water tank (not shown). The mobile decoking system 105 may include a pump system (not shown) that fluidly communicates source water (not shown) from the source water outlet 165 to the radiant tubing inlet 120 via a conduit 170. The radiant tubing outlet 125 may fluidly communicate coke-laden wastewater (not shown) to the wastewater inlet 175 of the mobile decoking system 105 via a conduit 180. Similarly, the mobile decoking system 105 may include a pump system (not shown) that fluidly communicates source water (not shown) from the source water outlet 185 to the convection tubing inlet 140 via a conduit 190. The convection tubing outlet 145 may fluidly communicate coke-laden wastewater (not shown) to the wastewater inlet 195 of the mobile decoking system 105 via a conduit 197.

While not shown, a mechanical pig (not shown), such as, for example, a scraper, studded, brush, or any other type or kind of pig may be disposed in the fluid path within the lumen of the tubular coils 130 and/or 150. The pump system (not shown) of the mobile decoking system 105 may pump source water (not shown) to propel the pig (not shown) through the tubes 130 or 150. Valves (not shown) on either side of the fluid flow path may be advantageously used, in addition to the application of fluid pressure, to propel the pig (not shown) in a unidirectional or bi-directional manner. As the pig (not shown) traverses the tubes 130 or 150 under fluid pressure, the dislodged residue or scale may be flushed from the tubing 130 or 150 with the source water (not shown) flowing therethrough, forming what is referred to as coke-laden wastewater (not shown) due to the fact that it includes dislodged coke from the tubes 130 or 150. Due to the size, shape, and complexity of the tubes 130 or 150, which may vary from application to application, the volume of water required to fully decoke the fired heater 100 is voluminous. The wastewater (not shown) generated, is equally voluminous, and includes coke, residue, and scale that must be disposed of in a safe and environmentally conscious manner. While the mobile decoking system 105 removes substantive portions of visible coke prior to discharging the wastewater (not shown) out of the wastewater outlet 160, the wastewater (not shown) that is discharged from the mobile decoking system 105 remains contaminated by coke, is not suitable for reuse, and is not suitable for discharge on-site for environmental reasons.

While the mechanical decoking method has proven to be the most effective and favored method of decoking in the industry, it too presents a number of challenges. Specifically, a voluminous amount of source water is required on-site to fully decoke the fired heater producing a substantially equal volume of wastewater, containing dislodged coke, deposits, residue, or scale, that must be dealt with. While it is an absolute requirement to decoke on-site, the coke-laden wastewater is typically stored during decoking operations and then transported off site for further processing or disposed of on-site in a safe and environmentally conscious manner. As such, mechanical decoking requires additional on-site storage and in applications where wastewater is transported off site, additional trucking resources. Thus, the substantial volume of source water required on-site, and the substantially equal volume of wastewater produced are significant drivers of cost in decoking operations. Notwithstanding, decoking operations are a necessity required as part of regular maintenance of the fired heater.

Accordingly, in one or more embodiments of the present invention, methods of, and systems for, mobile water filtration enables on-site recycling of wastewater for reuse in, for example, mechanical decoking operations of fired-heaters, furnaces, boilers, or other systems prone to build up of deposits, residue, or scale and enables on-site disposal of wastewater in a safe and environmentally conscious manner. In certain batching embodiments, a coagulant, a flocculant, and a plurality of cascaded filters of increasingly fine pitch may be used to treat wastewater and remove particulate matter, such as, for example, coke, for reuse or safe disposal. In certain continuous embodiments, a plurality of cascaded filters of increasingly fine pitch may be used to treat wastewater and remove particulate matter. In addition, operations may be automated for use with a decoking system in a manner that does not require human intervention except for maintenance operations relating to filters. Advantageously, the volume of source water required for mechanical decoking operations is significantly reduced and the volume of wastewater produced is substantially reduced as a consequence. In addition, the filtered water exiting the mobile water filtration system may be disposed of on-site in a safe and environmentally conscious manner, thereby reducing or eliminating the need for further treatment or transport off site for further treatment and disposal. Because of the significant reduction in the volume of water required to be sourced for mechanical decoking operations and the ability to safely dispose filtered water after completion of operations on-site, the method and system significantly reduces costs associated with performing mechanical decoking operations.

Figure 2A:
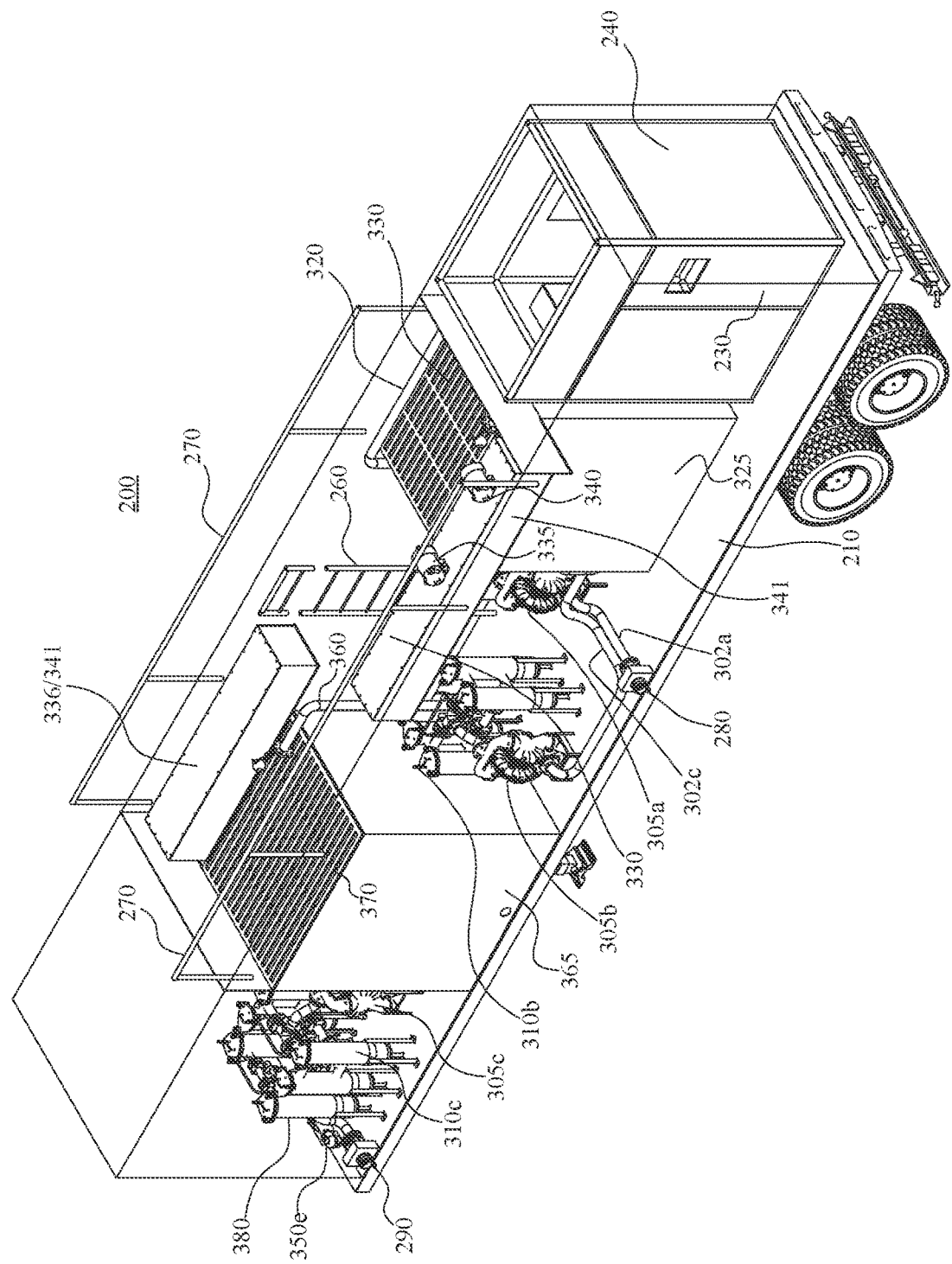
FIG. 2A shows a rear-facing perspective interior view of a mobile water filtration system in accordance with one or more embodiments of the present invention.

FIG. 2A shows a rear-facing perspective interior view of a mobile water filtration system 200 in accordance with one or more embodiments of the present invention. In certain embodiments, the system 200 may include filtration and treatment equipment disposed in a mobile trailer 210 that facilitates placing the system 200 on-site and travel from site to site. In other embodiments, the filtration and treatment equipment may be disposed on a mobile skid (not shown). In still other embodiments, the filtration and treatment equipment may be disposed on any other type or kind of mobile platform (not shown) capable of travel from site to site. One of ordinary skill in the art, having the benefit of this disclosure, will appreciate that the type or kind of mobile trailer, as well as the configuration of equipment disposed therein, may vary based on an application or design in accordance with one or more embodiments of the present invention.

The mobile trailer 210 may include a wastewater inlet connector 280 that facilitates fluid connectivity between the source of coke-laden wastewater (not shown), such as, for example, a dirty water tank of a mobile decoking system (e.g., 105 of FIG. 1) that is input into the mobile water filtration system 200. Similarly, the mobile trailer 210 may include a filtered water outlet connector 290 that facilitates fluid connectivity between the output of the system 200 and the clean water tank of the mobile decoking system (e.g., 105 of FIG. 1), or once decoking operations are complete, discharge to an on-site drain or storage. The mobile water filtration system 200 may include an access door 230 to a control room 240 that safely houses equipment, including a control system (e.g., 385 of FIG. 7), used to control the operation of the system 200, discussed in more detail herein. In the filtration and treatment area, the system 200 may further include a first pumping system 305a, a first filtration system (e.g., 310a, not shown in this view), and a first tank 325 disposed within the mobile trailer 210. In batching embodiments, the system 200 may further include a coagulant pumping system 335 that fluidly communicates coagulant from a coagulant tank 336 to the first tank 325, discussed in more detail herein. The system 200 may further include a flocculant pumping system 340 that fluidly communicates flocculant (not shown) from a flocculant tank 341 to the first tank 325, discussed in more detail herein. In continuous operation embodiments, the system 200 may not require one or more of coagulant pumping system 335, coagulant tank 336, flocculant pumping system 340, and/or flocculant tank 341. The first tank 325 may be fluidly connected to an inlet of a second pumping system 305b.

Figure 2B:
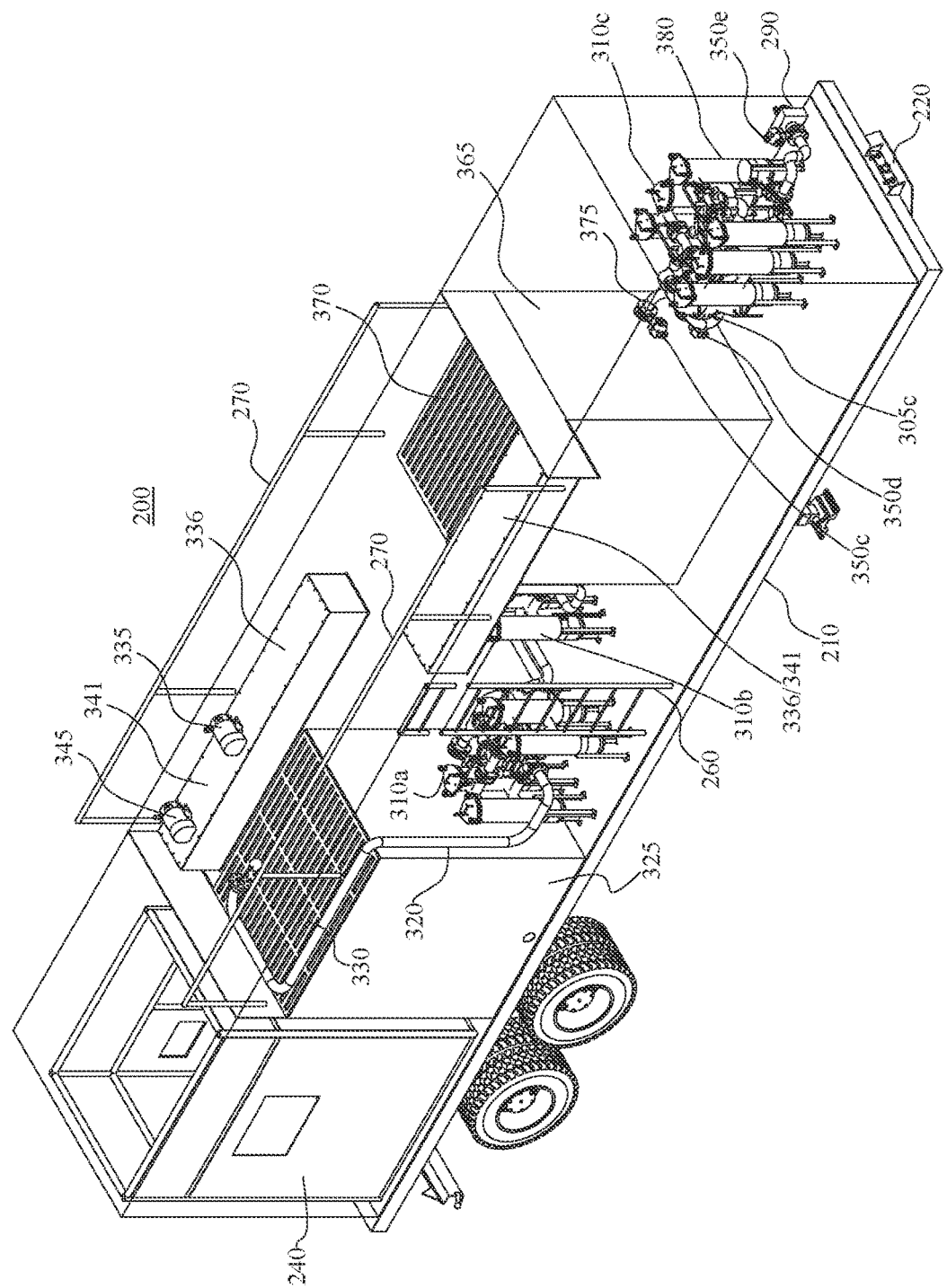
FIG. 2B shows a front-facing perspective interior view of a mobile water filtration system in accordance with one or more embodiments of the present invention.
Figure 2C:
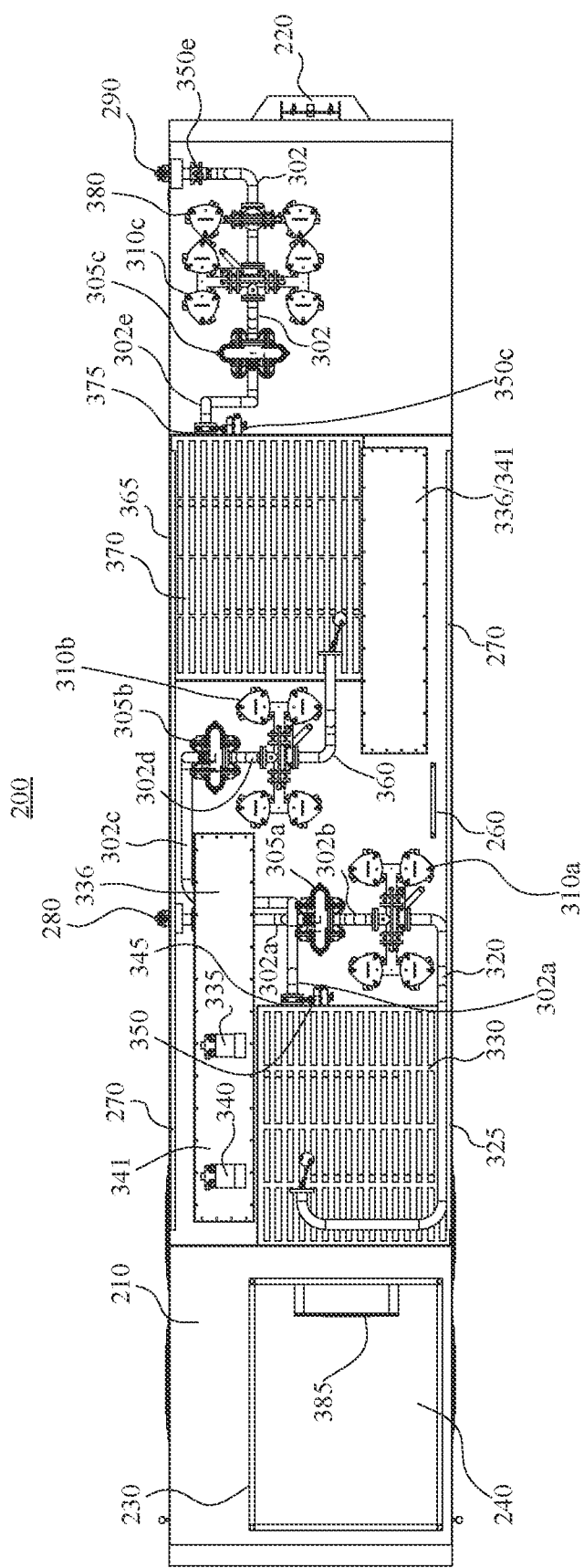
FIG. 2C shows a top plan interior view of a mobile water filtration system in accordance with one or more embodiments of the present invention.

The system 200 may further include the second pumping system 305b, a second filtration system 310b, and a second tank 365 also disposed within the mobile trailer 210. The second tank 365 may be fluidly connected to an inlet of a third pumping system 305c. The system 200 may further include the third pumping system 305c, a third filtration system 310c, and a fourth filtration system 380 that are disposed within the mobile trailer 210. An outlet of the fourth filtration system 380 may be fluidly connected to the outlet connector 290. Continuing, FIG. 2B shows a front-facing perspective interior view of a mobile water filtration system 200 in accordance with one or more embodiments of the present invention. The mobile trailer 210 may include a mobile hitch 220 to facilitate transport, a ladder 260 to provide rooftop access to the mobile trailer 210, and a plurality of safety rails 270 disposed along the rooftop of the mobile trailer 210. Continuing, FIG. 2C shows a top plan interior view of a mobile water filtration system 200 in accordance with one or more embodiments of the present invention. In this view, the location of the control room 240 in the rear of the mobile trailer 210 as well as the relative location of the filtration and treatment equipment is shown. However, one of ordinary skill in the art, having the benefit of this disclosure, will appreciate that the orientation, placement, and configuration of equipment may vary based on an application or design in accordance with one or more embodiments of the present invention.

Figure 3A:
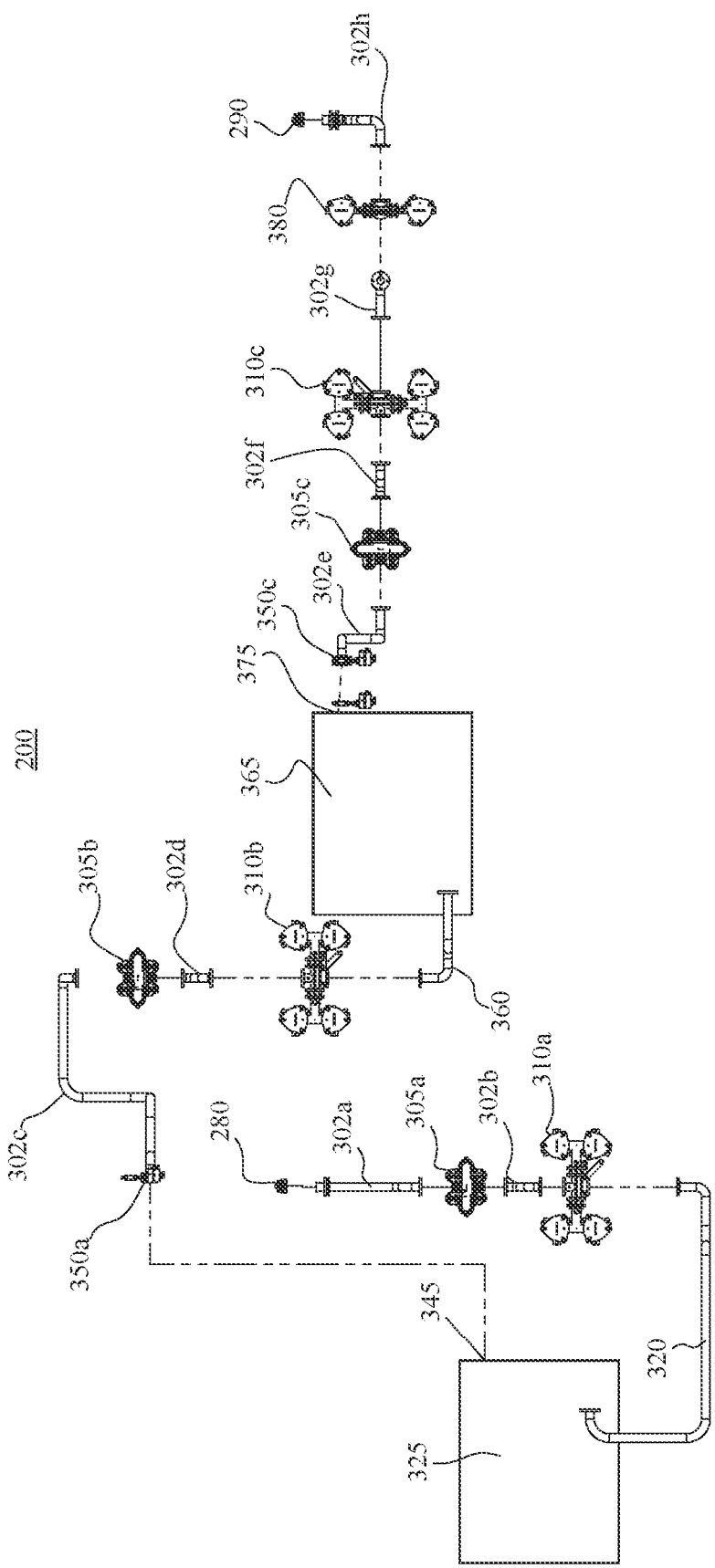
FIG. 3A shows a top plan exploded view of a mobile water filtration system in accordance with one or more embodiments of the present invention.

FIG. 3A shows a top plan exploded view of a mobile water filtration system 200 in accordance with one or more embodiments of the present invention. Coke-laden wastewater may be input into the system 200 via a wastewater inlet connector 280. A first pumping system 305a, a first filtration system 310a, and a first tank 325 may be disposed within the mobile trailer (e.g., 210, not shown in this view). The wastewater inlet connector 280 may be fluidly connected, via a conduit 302a, to an inlet (not independently illustrated) of the first pumping system 305a. An outlet (not independently illustrated) of the first pumping system 305a may be fluidly connected, via a conduit 302b, to an inlet (not independently illustrated) of the first filtration system 310a. An outlet (not independently illustrated) of the first filtration system 310a may be fluidly connected, via a conduit 320, to an inlet of the first tank 325.

A second pumping system 305b, a second filtration system 310b, and a second tank 365 may also be disposed within the mobile trailer (e.g., 210, not shown in this view). An outlet (not independently illustrated) of the first tank 325 may be fluidly connected, via valves 350a and 350b (not shown) and a conduit 302c, to an inlet (not independently illustrated) of the second pumping system 305b. An outlet (not independently illustrated) of the second pumping system 305b may be fluidly connected, via a conduit 302d, to an inlet (not independently illustrated) of second filtration system 310b. An outlet (not independently illustrated) of the second filtration system 310b may be fluidly connected, via a conduit 360, to an inlet (not independently illustrated) of the second tank 365.

A third pumping system 305c, a third filtration system 305c, and a fourth filtration system 380 may also be disposed within the mobile trailer (e.g., 210, not shown in this view). An outlet (not independently illustrated) of the second tank 365 may be fluidly connected, via valves 350c and 350d (not shown) and a conduit 302e, to an inlet (not independently illustrated) of the third pumping system 305c. An outlet (not independently illustrated) of the third pumping system 305c may be fluidly connected, via a conduit 302f, to an inlet (not independently illustrated) of the third filtration system 305c. An outlet (not independently illustrated) of the third filtration system 305c may be fluidly connected, via a conduit 302g, to an inlet (not independently illustrated) of the fourth filtration system 380. An outlet (not independently illustrated) of the fourth filtration system 380 may be fluidly connected, via a conduit 302h, to the filtered water outlet connector 290.

Figure 3B:
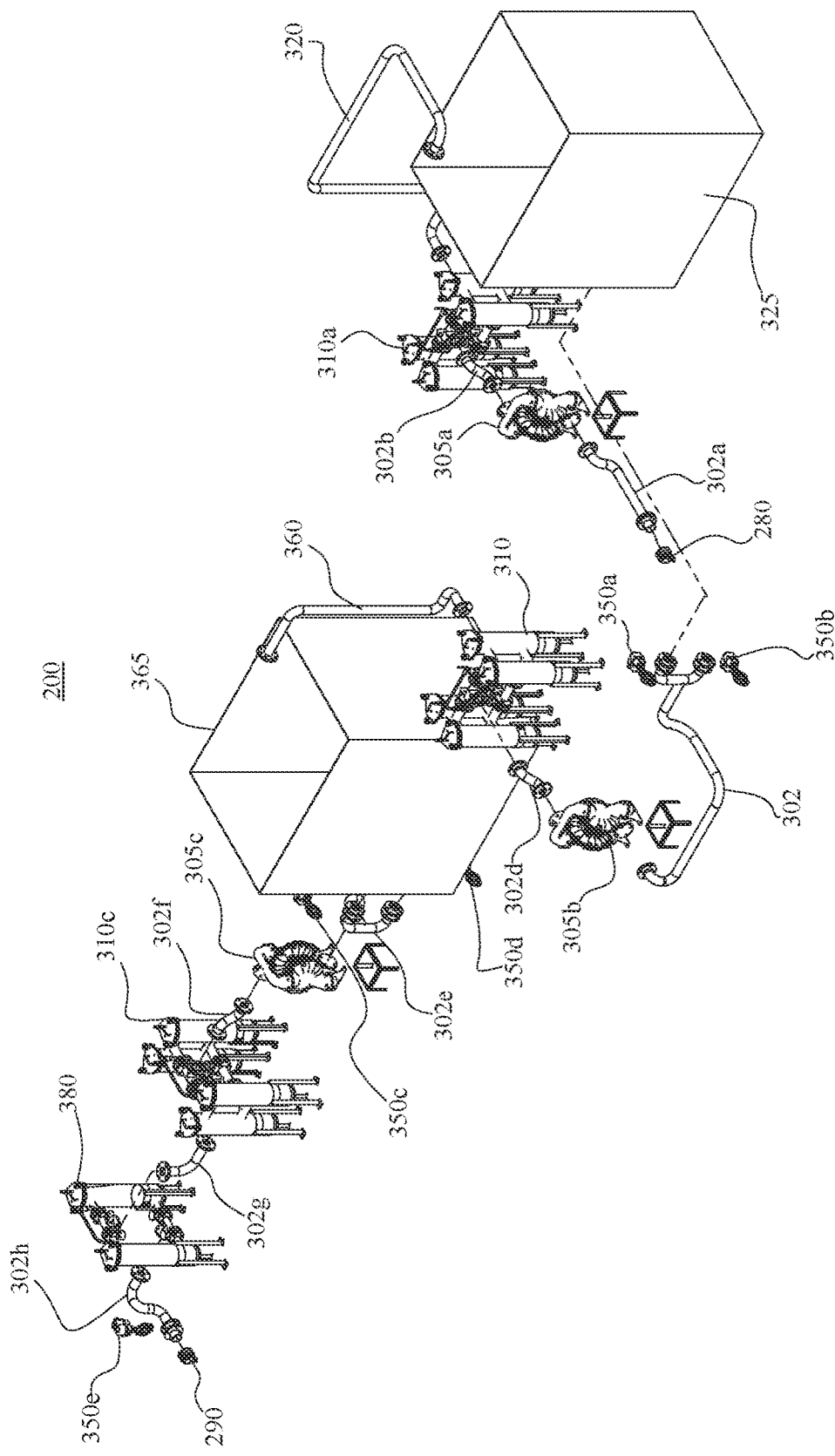
FIG. 3B shows a rear-facing perspective exploded view of a mobile water filtration system in accordance with one or more embodiments of the present invention.
Figure 3C:
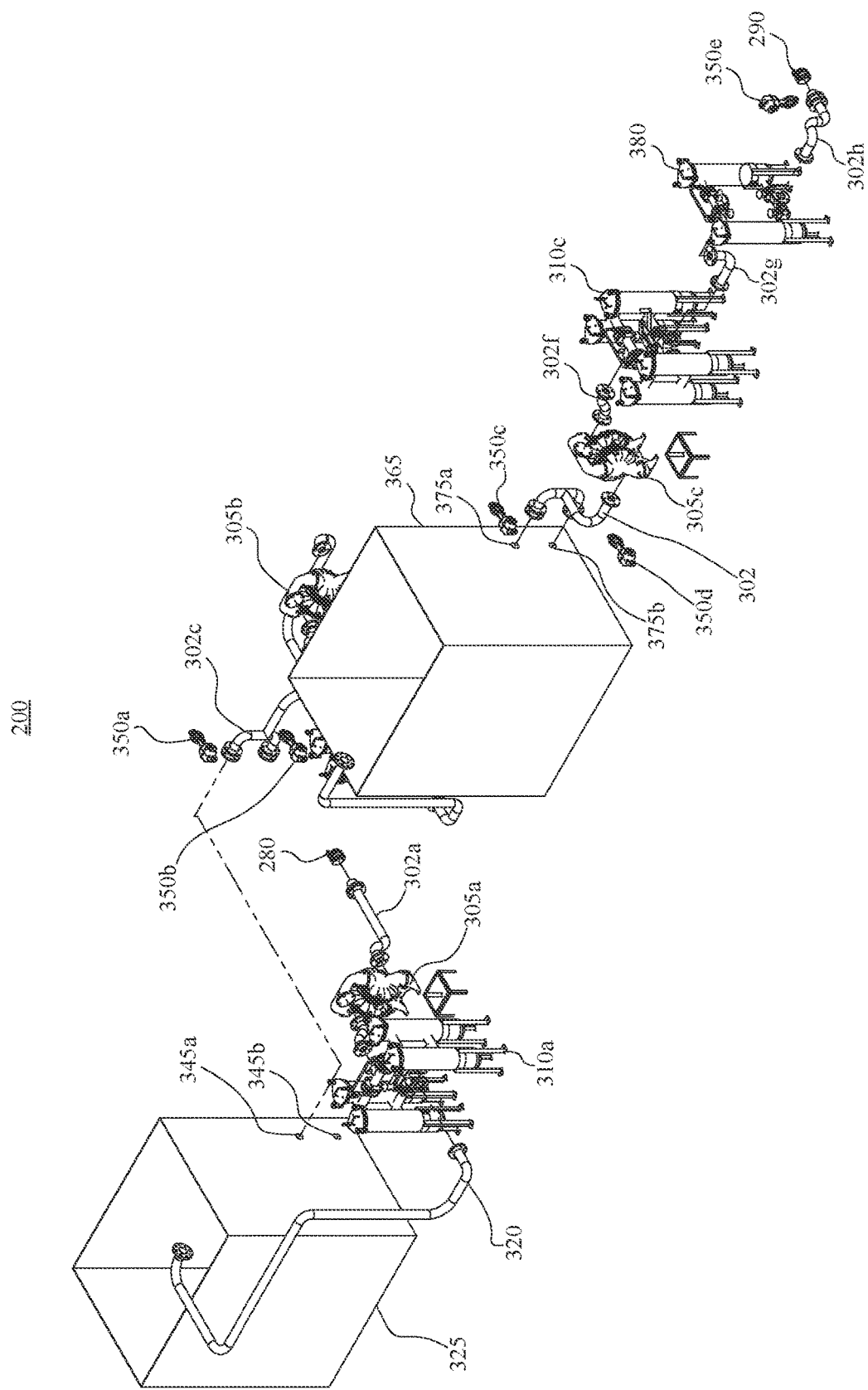
FIG. 3C shows a front-facing perspective exploded view of a mobile water filtration system in accordance with one or more embodiments of the present invention.

Continuing, FIG. 3B shows a rear-facing perspective exploded view of a mobile water filtration system 200 in accordance with one or more embodiments of the present invention. First tank 325 may include dual ported outputs (e.g., 345a, 345b of FIG. 3C) that are fluidly connected to dual ported inputs of conduit 302c via valves 350a and 350b. A single ended output of conduit 302c may fluidly connect to the inlet (not independently illustrated) of the second pumping system 305b. Continuing, FIG. 3C shows a front-facing perspective exploded view of a mobile water filtration system 200 in accordance with one or more embodiments of the present invention. Similar to dual ported outputs 345a and 345b of first tank 325, second tank 365 may also include dual ported outputs 375a and 375b that are fluidly connected to dual ported inputs of conduit 302e via valves 350c and 350d. A single ended output of conduit 302e may fluidly connect to the inlet (not independently illustrated) of the third pumping system 305c.

Figure 4A:
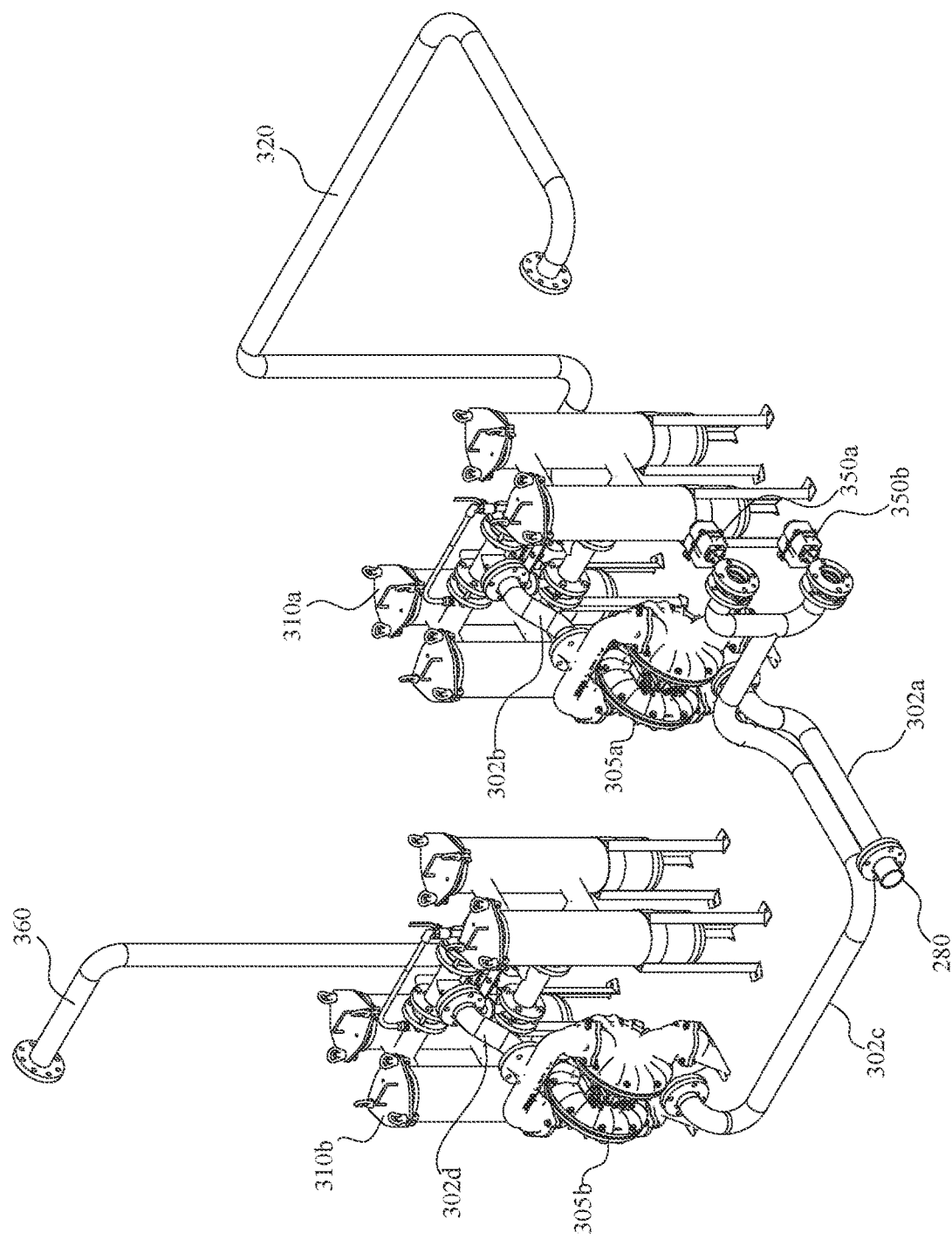
FIG. 4A shows a rear-facing perspective view of a first pumping system, first filtration system, second pumping system, and second filtration system of a mobile water filtration system in accordance with one or more embodiments of the present invention.

FIG. 4A shows a rear-facing perspective view of a first pumping system 305a, first filtration system 310a, second pumping system 305b, and second filtration system 310b of a mobile water filtration system 200 in accordance with one or more embodiments of the present invention. In this view, fluid communication from inlet connector 280 to first pumping system 305a is more clearly shown. In certain embodiments, first pumping system 305a may be, for example, an All-Flo® A300 air-operated double-diaphragm pump. Such pumping systems have a fluid inlet (not independently labeled) on the bottom portion of the pump, an air input (not independently labeled) disposed between the diaphragms (not shown) that receives compressed air, and a fluid outlet (not independently labeled) on the top portion of the pump. In such a device, an air-valve (not shown) directs pressurized air behind the diaphragm (not shown) on the right, causing the diaphragm (not shown) on the right to move outward to the right. Since the right diaphragm (not shown) and the left diaphragm (not shown) are connected via a connecting rod (not shown), when the right diaphragm (not shown) moves to the right, the left diaphragm (not shown) also moves to the right. When the diaphragm (not shown) on the left side moves to the right, in what is referred to as a suction stroke, the left suction ball (not shown) moves upwards to open and the left discharge ball (not shown) moves downward to close. These actions under air pressure create suction and draw fluids into the left side chamber.

The air-valve (not shown) also directs pressurized air behind the left diaphragm (not shown), causing the left diaphragm (not shown) to move outward to the left. Since both the left diaphragm (not shown) an the right diaphragm (not shown) are connected via the connecting rod (not shown), when the left diaphragm (not shown) moves outward, the left discharge ball (not shown) moves upwards to open and the left suction ball (not shown) moves downward to close. This causes fluids to leave the outlet of the pump. Simultaneously, the right diaphragm (not shown) moves inward to the left, which causes the right suction ball (not shown) to open and the right discharge ball (not shown) to close, which in turn creates suction, drawing fluids into the right chamber. This process of alternating right suction and left discharge, as well as left suction and right discharge, creates a pumping action that draws in and conveys fluids in a manner that is controllable by the application of compressed air to the air-valve (not shown). The control system (e.g., 385 of FIG. 7) may be calibrated based on the type or kind of pumping system used such that the control system can control the operation of the pumping system in its full range of operation with certainty.

In certain embodiments, second pumping system 305b and third pumping system (e.g., 305c) may be the same type or kind of pumping system as that of 305a and may operate in the same manner. Notwithstanding the above, one of ordinary skill in the art, having the benefit of this disclosure, will appreciate that the above-noted pumping system is merely exemplary and other types or kinds of pumping systems may be used in accordance with one or more embodiments of the present invention. In addition, one of ordinary skill in the art will also appreciate that the first pumping system 305a, second pumping system 305b, and third pumping system 305c may not be the same and may vary in accordance with one or more embodiments of the present invention. Fluids pumped by first pumping system 305a are directed to an inlet (not independently labeled) of the first filtration system 310a. In certain embodiments, first filtration system 310a may be, for example, a Rosedale Products® Model 82 quad capacity filtration system. Such filtration systems have an inlet (not independently labeled) on a top side and an outlet (not shown) disposed on a bottom side. Fluids are conveyed from inlet, through a plurality of filters or baskets, to the outlet. While the embodiment depicted includes a quad capacity filtration system, one of ordinary skill in the art will recognize that the capacity required may vary based on the flow rates of fluids expected to flow therethrough and an appropriate filtration system may be used in accordance with one or more embodiments of the present invention. In certain embodiments, second filtration system 310b and third filtration system (e.g., 310c) may be the same type or kind of filtration system as that of 310a and may operate in the same manner. Notwithstanding the above, one of ordinary skill in the art, having the benefit of this disclosure, will appreciate that the above-noted filtration system is merely exemplary and other types or kinds of filtration systems may be used in accordance with one or more embodiments of the present invention. In addition, one of ordinary skill in the art will also appreciate that the first filtration system 310a, second filtration system 310b, and third filtration system 310c may not be the same and may vary in accordance with one or more embodiments of the present invention.

In one or more embodiments of the present invention, a plurality of cascaded filtration systems may be used that filter increasingly fine particles out of the wastewater as it proceeds through the system 200. In certain embodiments, the first filtration system 310a may use a plurality of filters (not shown) that filter particles having a size in a range between 750 microns and 80 microns. The second filtration system 310b may use a plurality of filters (not shown) that filter particles having a size in a range between 300 microns and 60 microns. The third filtration system (e.g., 310c) may use a plurality of filters (not shown) that filter particles having a size in a range between 150 microns and 40 microns. The fourth filtration system (e.g., 380) may use a plurality of filters (not shown) that filter particles having a size smaller than 150 microns or 40 microns. One of ordinary skill in the art will appreciate that the types or kinds of filters used at each stage, as well as the range of particulate matter that they are capable of filtering out, may vary based on an application or design in accordance with one or more embodiments of the present invention. In addition, one of ordinary skill in the art will appreciate that the types or kinds of filters, as well as the range of particulate matter that they are capable of filtering out, may vary based on the nature of the wastewater and the particulate matter therein, that may vary from application to application, in accordance with one or more embodiments of the present invention.

Figure 4B:
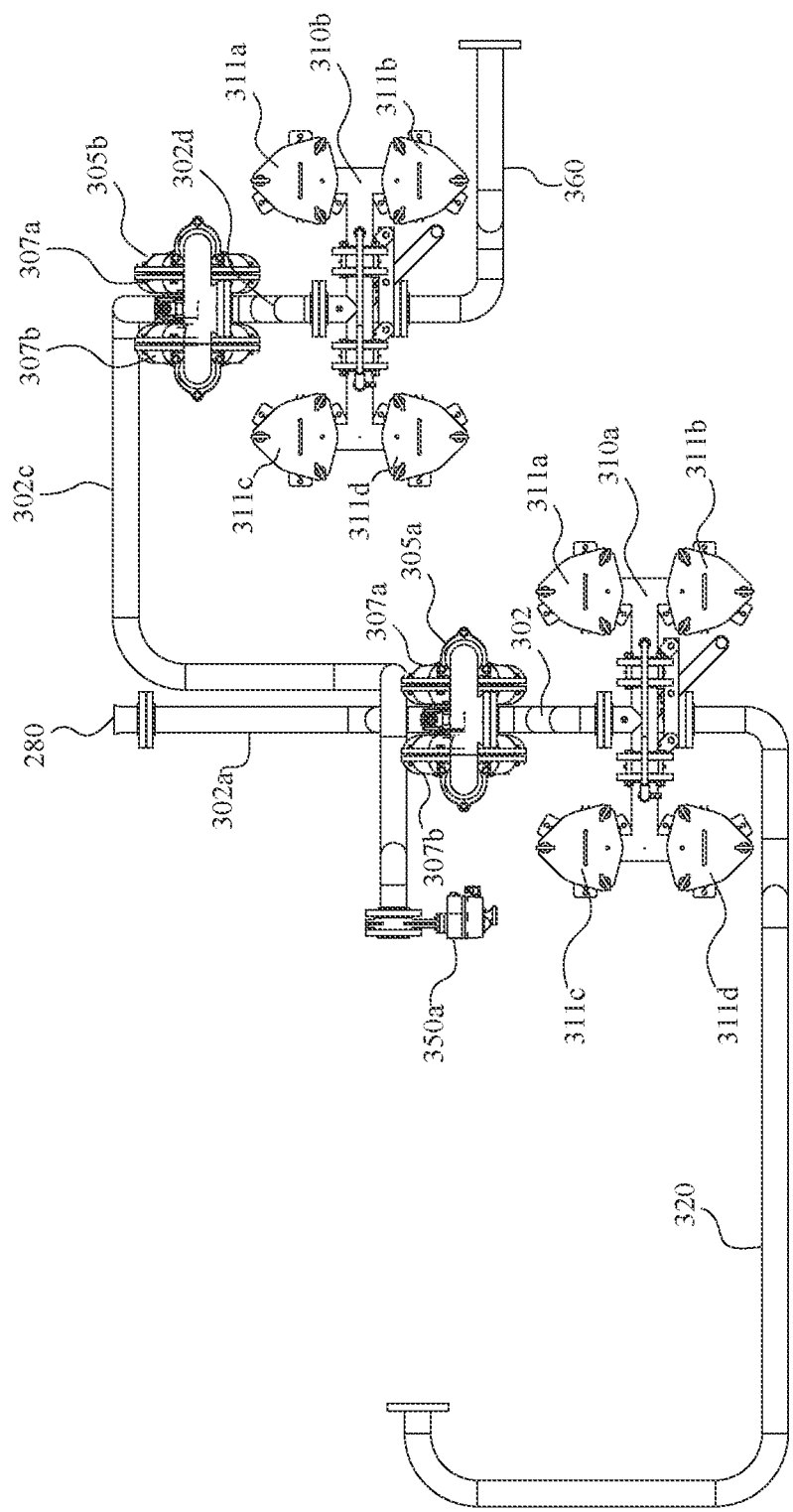
FIG. 4B shows a top plan view of a first pumping system, first filtration system, second pumping system, and second filtration system of a mobile water filtration system in accordance with one or more embodiments of the present invention.
Figure 4C:
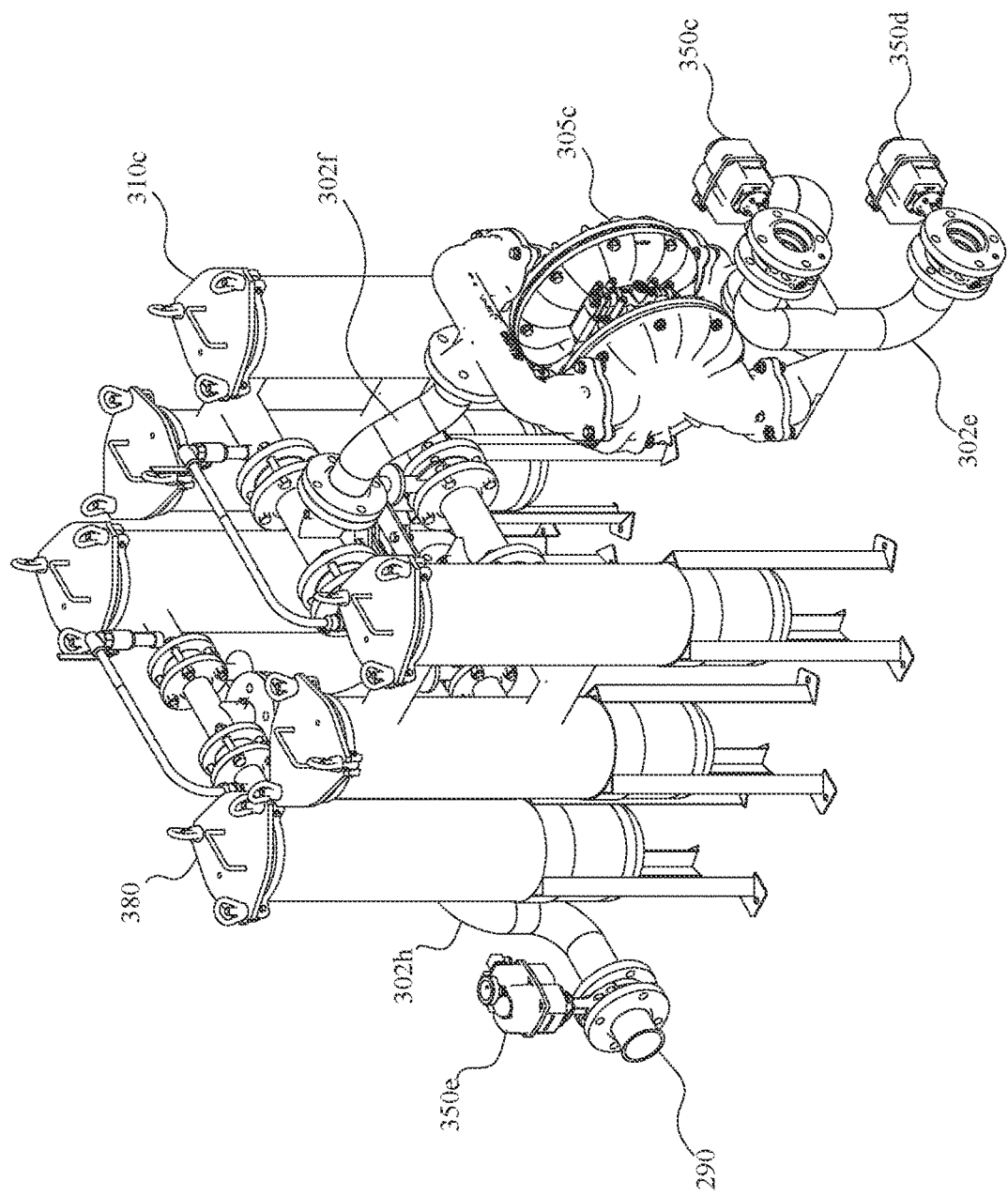
FIG. 4C shows a front-facing perspective view of a third pumping system, third filtration system, and fourth filtration system of a mobile water filtration system in accordance with one or more embodiments of the present invention.
Figure 4D:
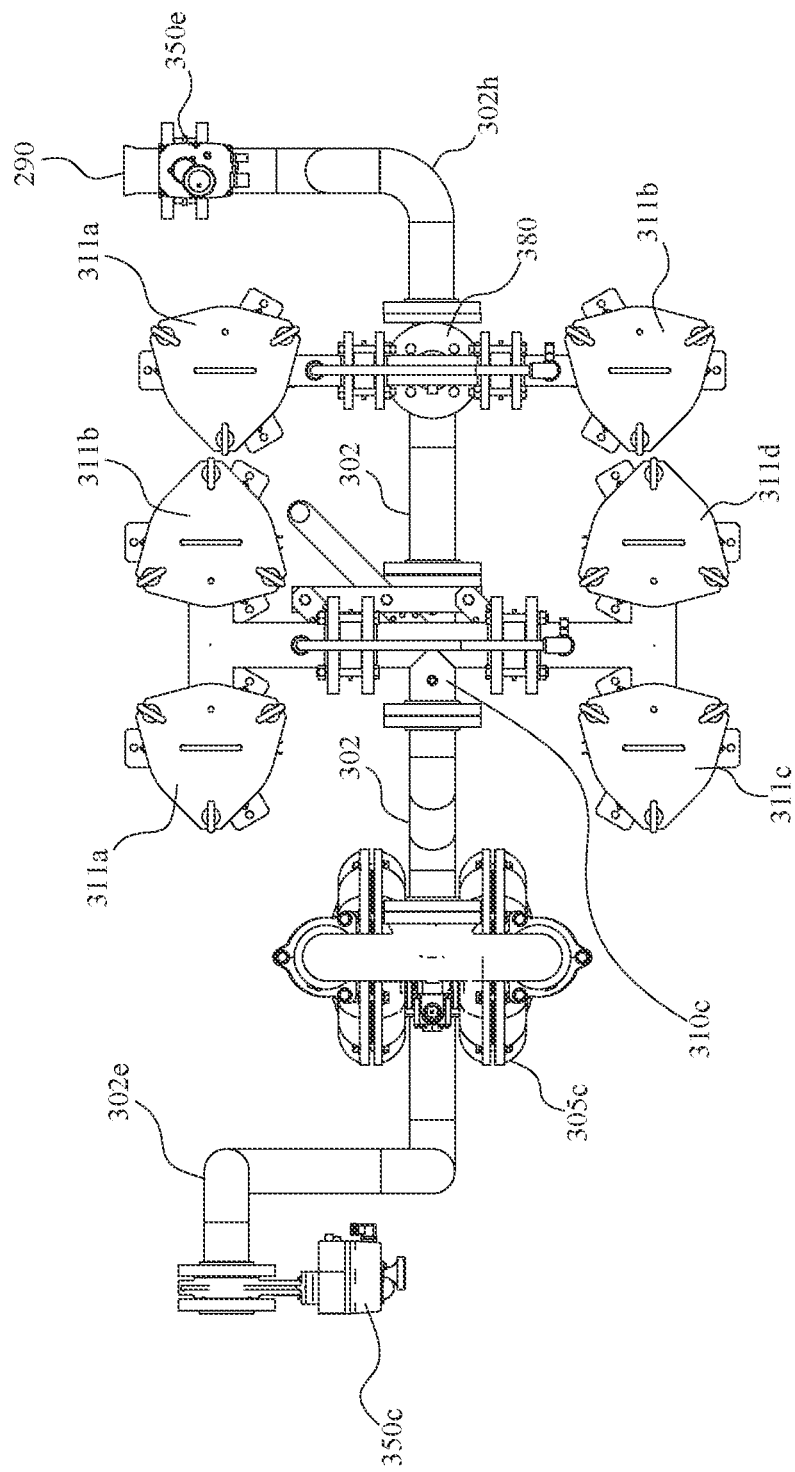
FIG. 4D shows a top plan view of a third pumping system, third filtration system, and fourth filtration system of a mobile water filtration system in accordance with one or more embodiments of the present invention.

Continuing, FIG. 4B shows a top plan view of a first pumping system 305a, first filtration system 310a, second pumping system 305b, and second filtration system 310b of a mobile water filtration system 200 in accordance with one or more embodiments of the present invention. In the example depicted, each of pumping systems 305a, 305b, and 305c (not shown) may include a right-side diaphragm housing 307a and a left side diaphragm housing 307b that house their respective right side and left side diaphragms (not shown). Similarly, each of filtration systems 310a, 310b, 310c (not shown), and 380 (not shown) may include a plurality of filter/basket housings 311 that house their respective filters or baskets (not shown). Continuing, FIG. 4C shows a front-facing perspective view of a third pumping system 305c, third filtration system 310c, and fourth filtration system 380 of a mobile water filtration system 200 in accordance with one or more embodiments of the present invention. As noted above, third pumping system 305c may use a plurality of filters (not shown) that filter particles having a size in a range between 150 microns and 40 microns. The fourth filtration system 380 may use a plurality of filters (not shown) that filter particles having a size smaller than 150 microns or 40 microns. Continuing, FIG. 4D shows a top plan view of a third pumping system 305c, third filtration system 310c, and fourth filtration system 380 of a mobile water filtration system 200 in accordance with one or more embodiments of the present invention. Since the fourth filtration system 380 is filtering particulate matter that is exceptionally small, thereby having a high flow rate therethrough, a filtration system with fewer filter/basket housings 311 may be used. In this instance, the fourth filtration system 380 may be a dual, rather than a quad, filter/basket type filtration system. However, one of ordinary skill in the art will appreciate that the selection of a type or kind of filtration system may vary based on the application or design in accordance with one or more embodiments of the present invention. If different flow rates or wastewater with different profiles of particulate contamination are expected, simulation or experimentation may be used to ensure the proper selection of the filtration systems suitable for a particular application.

Figure 5:
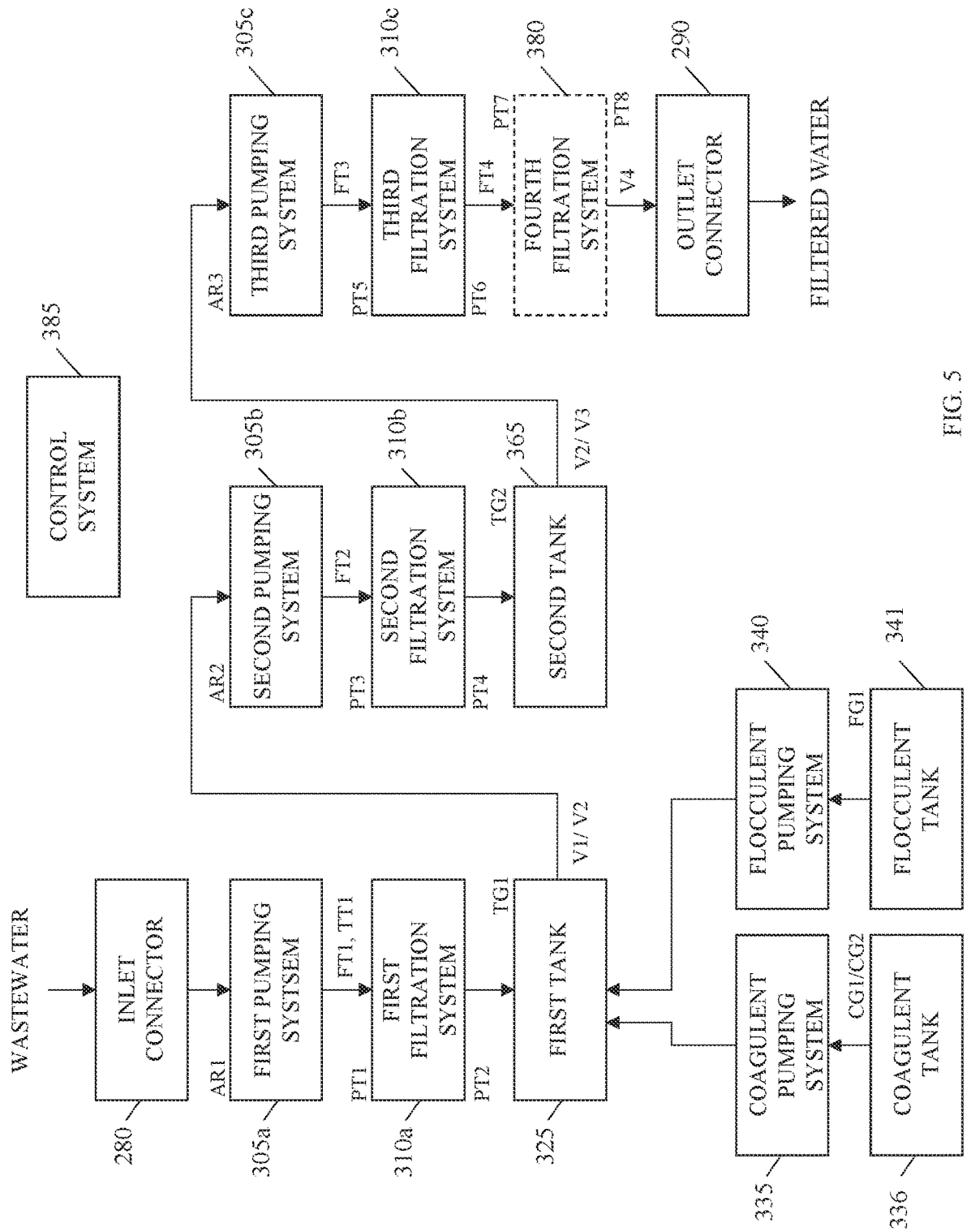
FIG. 5 shows a block diagram of a mobile water filtration system in accordance with one or more embodiments of the present invention.

FIG. 5 shows a block diagram of a mobile water filtration system 200 in accordance with one or more embodiments of the present invention. The system 200 may include a mobile trailer (e.g., 200 of FIG. 2) that includes an inlet connector 280 and an outlet connector 290.

A first pumping system 305a, a first filtration system 310a, and a first tank 325 may be disposed in the mobile trailer (e.g., 200 of FIG. 2). The inlet connector 280 may be fluidly connected to an inlet of the first pumping system 305a, an outlet of the first pumping system 305a may be fluidly connected to an inlet of the first filtration system 310a, and an outlet of the first filtration system 310a may be fluidly connected to an inlet of the first tank 325.

A second pumping system 305b, a second filtration system 310b, and a second tank 365 may be disposed in the mobile trailer (e.g., 200 of FIG. 2). An outlet of the first tank 325 may be fluidly connected to an inlet of the second pumping system 305b, an outlet of the second pumping system 305b may be fluidly connected to an inlet of the second filtration system 310b, and an outlet of the second filtration system 310b may be fluidly connected to an inlet of the second tank 365.

A third pumping system 305c, a third filtration system 310c, and a fourth filtration system 380 may be disposed in the mobile trailer (e.g., 200 of FIG. 2). An outlet of the second tank may be fluidly connected to an inlet of the third pumping system 305c, an outlet of the third pumping system 305c may be fluidly connected to an inlet of the third filtration system 310c, an outlet of the third filtration system 310c may be fluidly connected to an inlet of the fourth filtration system 380, and an outlet of the fourth filtration system 380 may be fluidly connected to the outlet connector 290. A control system 385 may control a pump speed of the first pumping system 305a, the second pumping system 305b, and a third pumping system 305c by controlling the application of air pressure to the air valves (not shown) of each pumping system.

A coagulant tank 336 may be fluidly connected to an inlet of a coagulant pumping system 335 and an outlet of the coagulant pumping system 335 may be fluidly connected to the first tank 325. The control system 385 may control the pump speed of the coagulant pumping system 335 to control the fluid communication of coagulant (not shown) from the coagulant tank 336 to the first tank 325. In certain embodiments, the coagulant may be aluminum sulfate, commonly referred to as alum. In other embodiments, the coagulant may be aluminum chlorohydrate. In still other embodiments, the coagulant may be polyaluminum chloride, ferric sulfate, or ferric chloride. One of ordinary skill in the art will appreciate that the coagulant may vary based on the type of hydrocarbons present in accordance with one or more embodiments of the present invention. Similarly, a flocculant tank 341 may be fluidly connected to an inlet of a flocculant pumping system 340 and an outlet of the flocculant pumping system 340 may be fluidly connected to the first tank 325. The control system 385 may control the pump speed of the flocculant pumping system 340 to control the fluid communication of flocculant (not shown) from the flocculant tank 341 to the first tank 325. In certain embodiments, the flocculant may an anionic polyacrylamide flocculant. In other embodiments, the flocculant may be a cationic polyacrylamide flocculant. In still other embodiments, the flocculant may be a cationic water-soluble polymer in emulsion. In still other embodiments, the flocculant may be emulsion based on cationic polyacrylamide. In still other embodiments, the flocculant may be commercially available flocculant under trade names AR-288, FBS-7802, FBS-7602, FBS-5804, or FBS-5604. One of ordinary skill in the art will appreciate that the flocculant may vary based on the type of hydrocarbons present in accordance with one or more embodiments of the present invention.

In one or more embodiments of the present invention, a plurality of valves may be used as part of control and automation of the system 200. For example, one or more valves (e.g., 350a, 350b) may control fluid communication between the first tank 325 and the second pump system 305b. Similarly, one or more valves (e.g., 350c, 350d) may control fluid communication between the second tank 365 and the third pump system 305c. In addition, one or more valves (e.g., 350e) may control fluid communication between the fourth filtration system 380 and the outlet connector 290. Each valve (e.g., 350) may be electronically controllable by the control system 385, as discussed in more detail herein. The first filtration system 310a may include one or more filters that filter particles having a size in a range between 750 microns and 80 microns. The second filtration system 310b may include one or more filters that filter particles having a size in a range between 300 microns and 60 microns. The third filtration system 310c may include one or more filters that filter particles having a size in a range between 150 microns and 40 microns. The fourth filtration system 380 may include one or more filters that filter particles having a size smaller than 150 microns or 40 microns. One of ordinary skill in the art will recognize that the cascaded filter sizes may vary to enhance fluid flow rate through the system and prevent bottlenecking. The inlet connector 280 may receive wastewater from a dirty water tank of a mobile decoking system (e.g., 105 of FIG. 1) or frac tank and the outlet connector 290 may provide filtered water to a clean water tank (not shown) of the mobile decoking system (e.g., 105 of FIG. 1) or discharge the filtered water to an on-site drain or storage.

In one or more embodiments of the present invention, a plurality of controls may be used as part of control and automation of the system 200. For example, a first air regulator, AR1, may be used to regulate the provision of pressurized air, and thereby control the speed of, the first pumping system 305a, a second air regulator, AR2, may be used to regulate the provision of pressurized air, and thereby control the speed of, the second pumping system 305b, and finally, a third air regulator, AR3, may be used to regulate the provision of pressurized air, and thereby control the speed of, the third pumping system 305c. The control system 385 may control the air regulators AR1, AR2, and AR3, and thereby control the pump speeds of the first, second, and third pumping systems 305a, 305b, and 305c.

In one or more embodiments of the present invention, a plurality of sensors may be used as part of control and automation of the system 200. For example, a temperature sensor, TT1, may measure temperature of fluids prior to the first filtration system 310a, a first flow meter, FT1, may measure fluid flow into the first filtration system 310a, a second flow meter, FT2, may measure fluid flow into the second filtration system 310b, a third flow meter, FT3, may measure fluid flow into the third filtration system 310c, and a fourth flow meter, FT4, may measure fluid flow into the fourth filtration system 380. The control system 385 may monitor the temperature and flow rates of fluids as part of the control and automation of the system 200.

In one or more embodiments of the present invention, a plurality of level gauges may be used as part of control and automation of the system 200. For example, a first tank level gauge, TG1, may be used to measure the tank volume of the first tank 325, a second tank level gauge, TG2, may be used to measure the tank volume of the second tank 365, one or more coagulant level gauges, CG1 and CG2, may be used to measure the tank volumes of one or more coagulant tanks 336, and a flocculant level gauge, FG1, may be used to measure the tank volume of a flocculant tank 341. The control system 385 may monitor the tank volumes as part of the control and automation of the system 200.

In one or more embodiments of the present invention, a plurality of pressure sensors or transducers may be used as part of control and automation of the system 200. For example, a pressure sensor, PT1, may be disposed on the inlet side of the first filtration system 310a and a pressure sensor, PT2, may be disposed on the outlet side of the first filtration system 310a, a pressure sensor PT3, may be disposed on the inlet side of the second filtration system 310b and a pressure sensor, PT4, may be disposed on the outlet side of the first filtration system 310b, a pressure sensor, PT5, may be disposed on the inlet side of third filtration system 310c and a pressure sensor, PT6, may be disposed on the outlet side of the third filtration system 310c, and a pressure sensor, PT7, may be disposed on the inlet side of the fourth filtration system 380 and a pressure sensor, PT8, may be disposed on the outlet side of the fourth filtration system 380. The control system 385 may monitor the pressure readings from the pressure sensors and use the readings to determine whether the filters require replacement, as discussed in more detail herein.

Figure 6A:
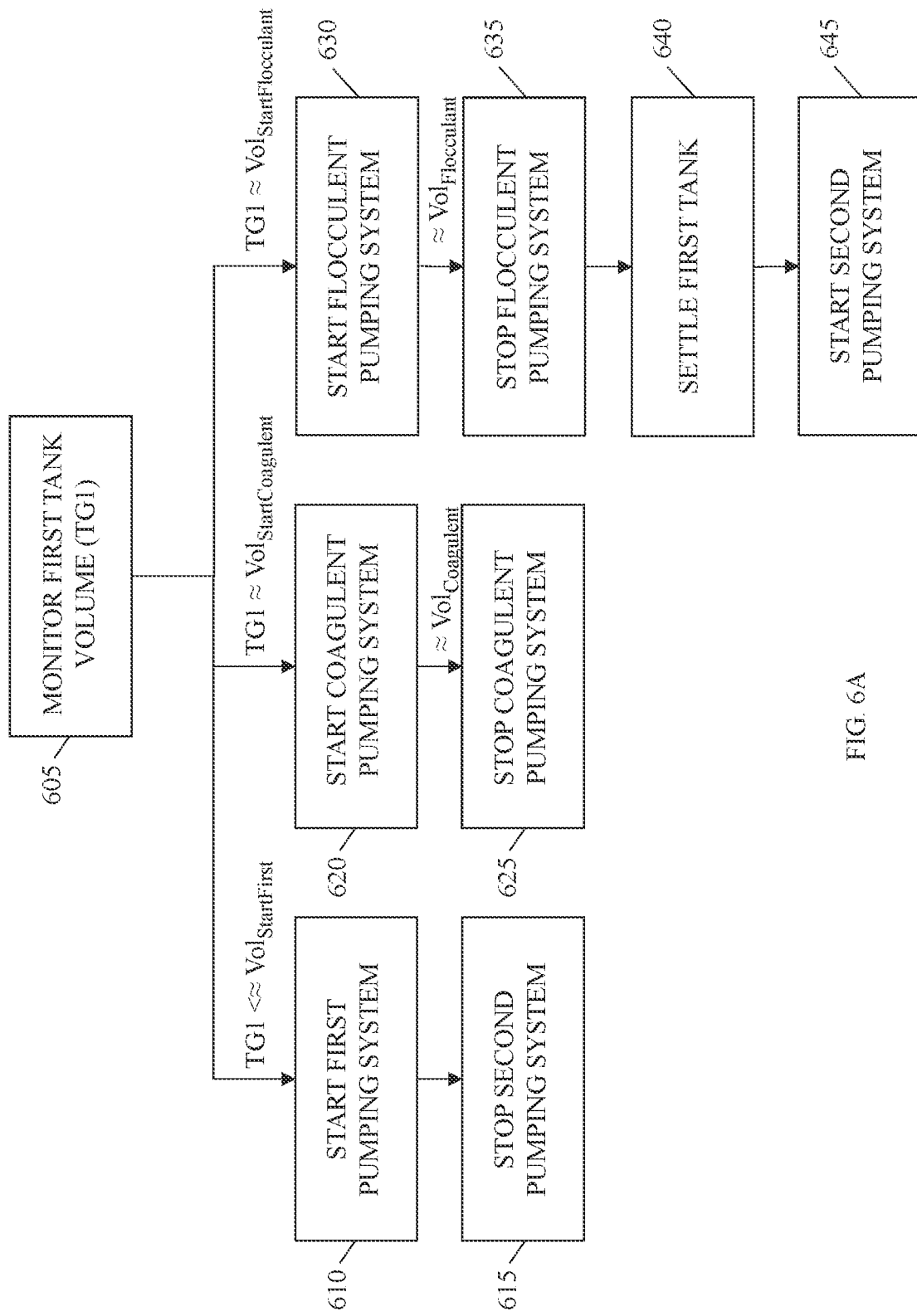
FIG. 6A shows a batch method of mobile water filtration in accordance with one or more embodiments of the present invention.

FIG. 6A shows a batch method of mobile water filtration in accordance with one or more embodiments of the present invention. A control system (e.g., 385) may monitor 605 a first tank volume, TG1. If the fluid volume, TG1, of the first tank (e.g., 325) falls below or is less than a predetermined volume, $Vol_{StartFirst}$, (e.g., TG1<≈500 gallons), the control system (e.g., 385) may start 610 the first pumping system (e.g., 305a) to fluidly communicate fluids from an inlet connector (e.g., 280) to the first pumping system (e.g., 305a), a first filtration system (e.g., 310a), and the first tank (e.g., 325), and stop 615 the second pumping system (e.g., 305b), thereby allowing the first tank (e.g., 325) to start filling. One of ordinary skill in the art will recognize that the predetermined volume, $Vol_{StartFirst}$, may be used as a metric of when to start filling the first tank (e.g., 325) and may vary based on the tank sizes, anticipated flow rates, pump capacity, and filtration capacity in accordance with one or more embodiments of the present invention. In certain embodiments, the predetermined volume, $Vol_{StartFirst}$, may be in a range between 0 and 500 gallons. In other embodiments, the predetermined volume, $Vol_{StartFirst}$, may be in a range between 0 and 250 gallons. In still other embodiments, the predetermined volume, $Vol_{StartFirst}$, may be in a range between 250 and 500 gallons.

If the fluid volume, TG1, of the first tank (e.g., 325) reaches a predetermined volume, $Vol_{StartCoagulant}$, (e.g., TG1≈500 gallons), the control system (e.g., 385) may start 620 the coagulant pumping system (e.g., 335) to fluidly communicate a predetermined volume of coagulant from the coagulant tank (e.g., 336) into the first tank (e.g., 325) and then stop 625 the coagulant pumping system (e.g., 335) after the predetermined volume, $Vol_{Coagulant}$, has been pumped into the first tank (e.g., 325). In certain embodiments, the predetermined volume, $Vol_{StartCoagulant}$, may be in a range between 500 and 1000 gallons. In other embodiments, the predetermined volume, $Vol_{StartCoagulant}$, may be in a range between 500 and 750 gallons. In still other embodiments, the predetermined volume, $Vol_{StartCoagulant}$, may be in a range between 750 and 1000 gallons. One of ordinary skill in the art will recognize that the predetermined volume may vary based on the tank size and the chemical composition of the coagulant in accordance with one or more embodiments of the present invention. In certain embodiments, the predetermined volume of coagulant, $Vol_{Coagulant}$, may be in a range between 1 and 10 gallons for every 2000 gallons in the first tank (e.g., 325). In other embodiments, the predetermined volume of coagulant, $Vol_{Coagulant}$, may be in a range between 1 and 3 gallons for every 2000 gallons in the first tank (e.g., 325). In still embodiments, the predetermined volume of coagulant, $Vol_{Coagulant}$, may be in a range between 3 and 6 gallons for every 2000 gallons in the first tank (e.g., 325). One of ordinary skill in the art will recognize that the predetermined volume of coagulant may vary based on the type of hydrocarbons present, the tank size, and the chemical composition of the coagulant in accordance with one or more embodiments of the present invention. Since the system 200 may be dynamic, the control system (e.g., 385) may dynamically and intelligently adjust the predetermined volume of coagulant. One of ordinary skill in the art will recognize that the second predetermined volume may be used as a metric of when to start application of coagulant and may vary based on the tank sizes, anticipated flow rates, pump capacity, and filtration capacity in accordance with one or more embodiments of the present invention.

If the fluid volume, TG1, of the first tank (e.g., 325) reaches a predetermined volume, $Vol_{StartFlocculant}$, (e.g., TG1≈1000 gallons), the control system (e.g., 385) may start 630 the flocculant pumping system (e.g., 340) to fluidly communicate a predetermined volume of flocculant, $Vol_{Flocculant}$, from the flocculant tank (e.g., 341) into the first tank (e.g., 325). In certain embodiments, the predetermined volume, $Vol_{StartFlocculant}$, may be in a range between 1000 and 1500 gallons. In other embodiments, the predetermined volume, $Vol_{StartFlocculant}$, may be in a range between 1000 and 1250 gallons. In still other embodiments, the predetermined volume, $Vol_{StartFlocculant}$, may be in a range between 1250 and 1500 gallons. One of ordinary skill in the art will recognize that the predetermined volume may vary based on the tank size and the chemical composition of the flocculant in accordance with one or more embodiments of the present invention. In certain embodiments, the predetermined volume of flocculant, $Vol_{Flocculant}$, may be in a range between 0.1 and 10 gallons for every 2000 gallons in the first tank (e.g., 325). In other embodiments, the predetermined volume of flocculant, $Vol_{Flocculant}$, may be in a range between 0.1 and 2 gallons for every 2000 gallons in the first tank (e.g., 325). In still embodiments, the predetermined volume of flocculant, $Vol_{Flocculant}$, may be in a range between 2 and 10 gallons for every 2000 gallons in the first tank (e.g., 325). One of ordinary skill in the art will recognize that the predetermined volume of flocculant may vary based on the type of hydrocarbons present, the tank size, and the chemical composition of the flocculant in accordance with one or more embodiments of the present invention. Since the system 200 may be dynamic, the control system (e.g., 385) may dynamically and intelligently adjust the predetermined volume of flocculant. One of ordinary skill in the art will recognize that the third predetermined volume may be used as a metric of when to start application of flocculant and may vary based on the tank sizes, anticipated flow rates, pump capacity, and filtration capacity in accordance with one or more embodiments of the present invention. After injection of the flocculant, the control system (e.g., 385) may pause for a predetermined amount of time to allow the first tank (e.g., 325) to settle 640 and then start 645 the second pumping system (e.g., 305*b*) to fluidly communicate fluids from the first tank (e.g., 325) to a second filtration system (e.g., 310*b*) and the second tank (e.g., 625). In certain embodiments, the predetermined amount of time to allow the first tank (e.g., 325) to settle may be in a range between 30 seconds and 5 minutes. One of ordinary skill in the art will recognize that the predetermined amount of time to settle may vary based on the type of hydrocarbons present, the tank size, and the chemical composition of the coagulant and flocculant used in accordance with one or more embodiments of the present invention.

Figure 6B:
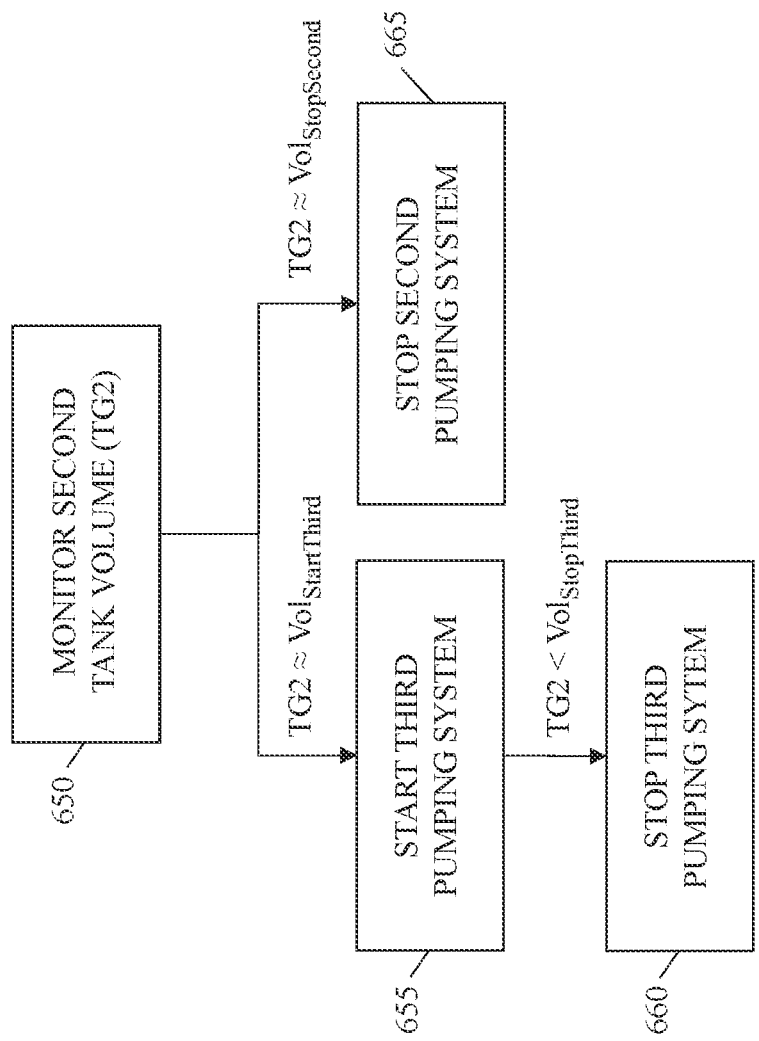
FIG. 6B shows a method of mobile water filtration in accordance with one or more embodiments of the present invention.

Continuing, FIG. 6B shows a method of mobile water filtration in accordance with one or more embodiments of the present invention. A control system (e.g., 385) may monitor 650 a second tank volume, TG2. If the fluid volume, TG2, of the second tank (e.g., 625) reaches a predetermined volume, $Vol_{StartThird}$, (e.g., TG2≈1500 gallons), the control system (e.g., 385) may start 655 a third pumping system (e.g., 305*c*) to fluidly communicate fluids from the second tank (e.g., 625) to a third filtration system (e.g., 310*c*), a fourth filtration system (e.g., 380), and an outlet connector (e.g., 290) and stop 660 the third pumping system (e.g., 305*c*) if the fluid volume falls below a predetermined volume, $Vol_{StopThird}$. In certain embodiments, the predetermined volume, $Vol_{StartThird}$, may be in a range between 1000 and 1500 gallons. In other embodiments, the predetermined volume, $Vol_{StartThird}$, may be in a range between 1000 and 1250 gallons. In still embodiments, the predetermined volume, $Vol_{StartThird}$, may be in a range between 1250 and 1500 gallons. One of ordinary skill in the art will recognize that the predetermined volume, $Vol_{StartThird}$, may vary based on the tank size in accordance with one or more embodiments of the present invention. In certain embodiments, the predetermined volume, $Vol_{StopThird}$, may be in a range between 500 and 0 gallons. In other embodiments, the predetermined volume, $VOl_{StopThird}$, may be in a range between 500 and 250 gallons. In still embodiments, the predetermined volume, $Vol_{StopThird}$, may be in a range between 250 and 0 gallons. One of ordinary skill in the art will recognize that the predetermined volume, $Vol_{StopThird}$, may vary based on the tank size in accordance with one or more embodiments of the present invention. If the fluid volume, TG2, of the second tank (e.g., 625) reaches a predetermined volume, $Vol_{StopSecond}$, (e.g., TG2≈2000 gallons), the control system (e.g., 385) may stop 665 the second pumping system (e.g., 305*b*) to prevent further fluids from being directed to the second tank (e.g., 625). In certain embodiments, the predetermined volume, $VOl_{StopSecond}$, may be in a range between 1500 and 2000 gallons. In other embodiments, the predetermined volume, $Vol_{StopSecond}$, may be in a range between 1500 and 1750 gallons. In still embodiments, the predetermined volume, $Vol_{StopSecond}$, may be in a range between 1750 and 2000 gallons. One of ordinary skill in the art will recognize that the predetermined volume, $Vol_{StopSecond}$, may vary based on the tank size in accordance with one or more embodiments of the present invention.

Figure 6C:
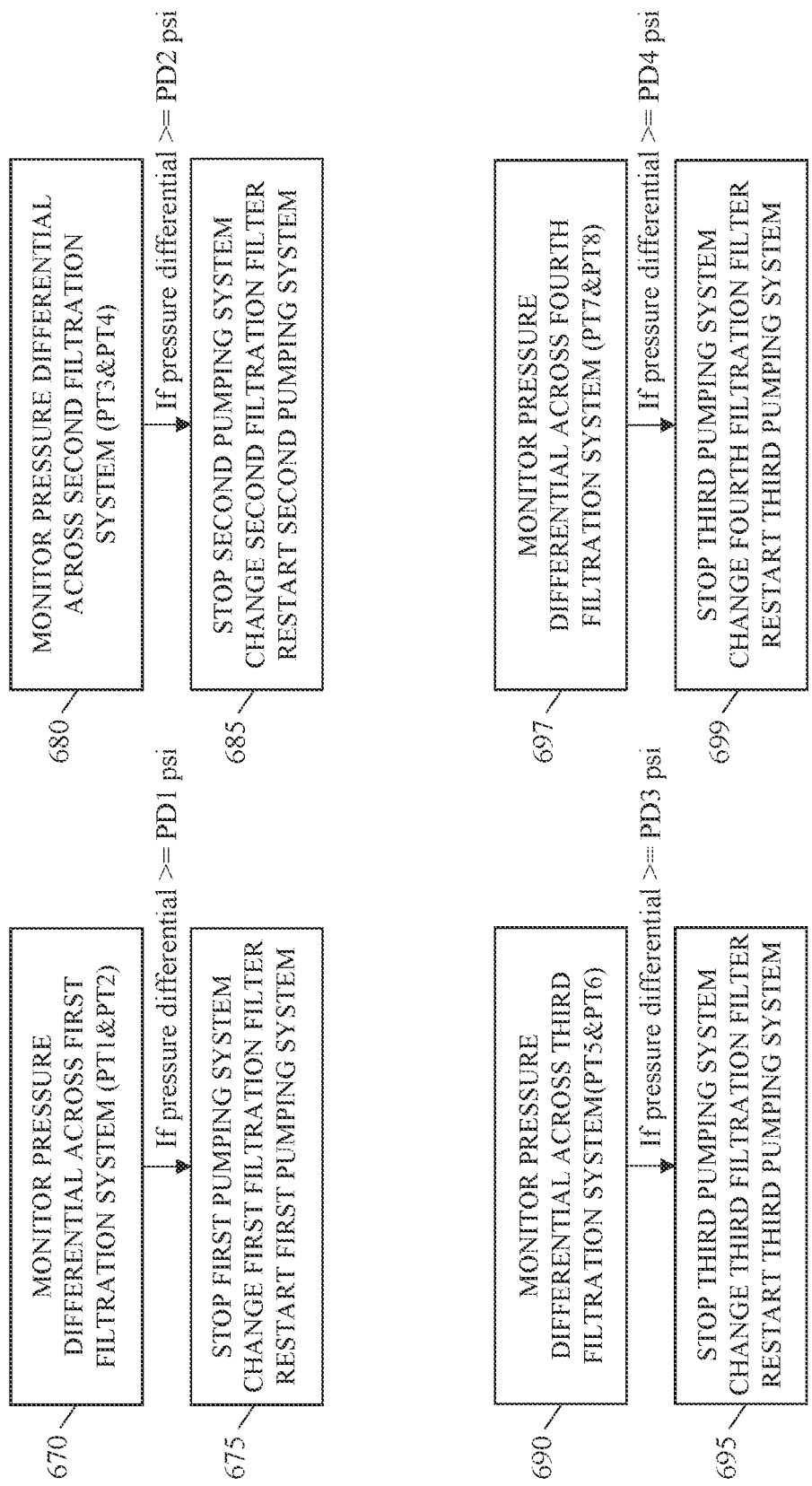
FIG. 6C shows a method of mobile water filtration in accordance with one or more embodiments of the present invention.

FIG. 6C shows a method of mobile water filtration in accordance with one or more embodiments of the present invention. The control system (e.g., 385) may monitor 670 the pressure differential (PT1-PT2) across the first filtration system (e.g., 310*a*). If the pressure differential, PD1, exceeds a predetermined threshold in pounds per square inch ("psi") (e.g., PT1-PT2>≈15 psi), the control system (e.g., 385) may stop 675 the first pumping system (e.g., 305*a*) to enable an operator to service the filters of the first filtration system (e.g., 310*a*) and then restart the first pumping system (e.g., 305*a*) after the filters have been cleaned or replaced. In certain embodiments, the pressure differential, PD1, may be in a range between 10 and 50 psi. In other embodiments, the pressure differential, PD1, may be in a range between 10 and 25 psi. In still other embodiments, the pressure differential, PD1, may be in a range between 25 and 50 psi. One of ordinary skill in the art will recognize that the pressure differential, PD1, may vary based on the type or kind of filtration system used. The control system (e.g., 385) may monitor 680 the pressure differential (PT3-PT4) across the second filtration system (e.g., 310*b*). If the pressure differential, PD2, exceeds a predetermined threshold (e.g., PT3-PT4>≈15 psi), the control system (e.g., 385) may stop 685 the second pumping system (e.g., 305*b*) to enable an operator to service the filters of the second filtration system (e.g., 310*b*) and then restart the second pumping system (e.g., 305*b*) after the filters have been cleaned or replaced. In certain embodiments, the pressure differential, PD2, may be in a range between 10 and 50 psi. In other embodiments, the pressure differential, PD2, may be in a range between 10 and 25 psi. In still other embodiments, the pressure differential, PD2, may be in a range between 25 and 50 psi. One of ordinary skill in the art will recognize that the pressure differential, PD2, may vary based on the type or kind of filtration system used.

The control system (e.g., 385) may monitor 690 the pressure differential (PT4-PT5) across the third filtration system (e.g., 310*c*). If the pressure differential, PD3, exceeds a predetermined threshold (e.g., PT4-PT5>≈15 psi), the control system (e.g., 385) may stop 695 the third pumping system (e.g., 305*c*) to enable an operator to service the filters of the third filtration system (e.g., 310*c*) and then restart the third pumping system (e.g., 305*c*) after the filters have been cleaned or replaced. In certain embodiments, the pressure differential, PD3, may be in a range between 10 and 50 psi. In other embodiments, the pressure differential, PD3, may be in a range between 10 and 25 psi. In still other embodiments, the pressure differential, PD3, may be in a range between 25 and 50 psi. One of ordinary skill in the art will recognize that the pressure differential, PD3, may vary based on the type or kind of filtration system used. The control system (e.g., 385) may monitor 697 the pressure differential (PT6-PT7) across the fourth filtration system (e.g., 380). If the pressure differential, PD4, exceeds a predetermined threshold (e.g., PT6-PT7>≈15 psi), the control system (e.g., 385) may stop 699 the third pumping system (e.g., 305*c*) to enable an operator to service the filters of the fourth filtration system (e.g., 380) and then restart the third pumping system (e.g., 305*c*) after the filters have been cleaned or replaced. In certain embodiments, the pressure differential, PD4, may be in a range between 10 and 50 psi. In other embodiments, the pressure differential, PD4, may be in a range between 10 and 25 psi. In still other embodiments, the pressure differential, PD4, may be in a range between 25 and 50 psi. One of ordinary skill in the art will recognize that the pressure differential, PD4, may vary based on the type or kind of filtration system used.

In one or more embodiments of the present invention, depending on the type of hydrocarbons present, the above-noted method may be modified for continuous operation rather than batching as shown and described with respect to FIG. 6A. In a continuous application, coagulant and/or flocculant, and associated equipment thereof, may not be required or may be manually shutoff. Similar to the above, a control system (e.g., 385) may monitor 605 a first tank volume, TG1. If the fluid volume, TG1, of the first tank (e.g., 325) falls below or is less than a predetermined volume, $Vol_{StartFirst}$, (e.g., TG1<≈500 gallons), the control system (e.g., 385) may start 610 the first pumping system (e.g., 305a) to fluidly communicate fluids from an inlet connector (e.g., 280) to the first pumping system (e.g., 305a), a first filtration system (e.g., 310a), and the first tank (e.g., 325), and stop 615 the second pumping system (e.g., 305b), thereby allowing the first tank (e.g., 325) to start filling. One of ordinary skill in the art will recognize that the predetermined volume, $Vol_{StartFirst}$, may be used as a metric of when to start filling the first tank (e.g., 325) and may vary based on the tank sizes, anticipated flow rates, pump capacity, and filtration capacity in accordance with one or more embodiments of the present invention. In certain embodiments, the predetermined volume, $Vol_{StartFirst}$, may be in a range between 0 and 500 gallons. In other embodiments, the predetermined volume, $Vol_{StartFirst}$, may be in a range between 0 and 250 gallons. In still other embodiments, the predetermined volume, $Vol_{StartFirst}$, may be in a range between 250 and 500 gallons.

The control system (e.g., 385) may monitor 650 a second tank volume, TG2. If the fluid volume, TG2, of the second tank (e.g., 625) reaches a predetermined volume, $Vol_{StartThird}$, (e.g., TG2≈1500 gallons), the control system (e.g., 385) may start 655 a third pumping system (e.g., 305c) to fluidly communicate fluids from the second tank (e.g., 625) to a third filtration system (e.g., 310c), a fourth filtration system (e.g., 380), and an outlet connector (e.g., 290) and stop 660 the third pumping system (e.g., 305c) if the fluid volume falls below a predetermined volume, $Vol_{StopThird}$. In certain embodiments, the predetermined volume, $Vol_{StartThird}$, may be in a range between 1000 and 1500 gallons. In other embodiments, the predetermined volume, $Vol_{StartThird}$, may be in a range between 1000 and 1250 gallons. In still embodiments, the predetermined volume, $Vol_{StartThird}$, may be in a range between 1250 and 1500 gallons. One of ordinary skill in the art will recognize that the predetermined volume, $Vol_{StartThird}$, may vary based on the tank size in accordance with one or more embodiments of the present invention. In certain embodiments, the predetermined volume, $Vol_{StopThird}$, may be in a range between 500 and 0 gallons. In other embodiments, the predetermined volume, $Vol_{StopThird}$, may be in a range between 500 and 250 gallons. In still embodiments, the predetermined volume, $Vol_{StopThird}$, may be in a range between 250 and 0 gallons. One of ordinary skill in the art will recognize that the predetermined volume, $Vol_{StopThird}$, may vary based on the tank size in accordance with one or more embodiments of the present invention. If the fluid volume, TG2, of the second tank (e.g., 625) reaches a predetermined volume, $Vol_{StopSecond}$, (e.g., TG2≈2000 gallons), the control system (e.g., 385) may stop 665 the second pumping system (e.g., 305b) to prevent further fluids from being directed to the second tank (e.g., 625). In certain embodiments, the predetermined volume, $Vol_{StopSecond}$, may be in a range between 1500 and 2000 gallons. In other embodiments, the predetermined volume, $Vol_{StopSecond}$, may be in a range between 1500 and 1750 gallons. In still embodiments, the predetermined volume, $Vol_{StopSecond}$, may be in a range between 1750 and 2000 gallons. One of ordinary skill in the art will recognize that the predetermined volume, $Vol_{StopSecond}$, may vary based on the tank size in accordance with one or more embodiments of the present invention.

The control system (e.g., 385) may monitor 670 the pressure differential (PT1-PT2) across the first filtration system (e.g., 310a). If the pressure differential, PD1, exceeds a predetermined threshold in pounds per square inch ("psi") (e.g., PT1-PT2>≈15 psi), the control system (e.g., 385) may stop 675 the first pumping system (e.g., 305a) to enable an operator to service the filters of the first filtration system (e.g., 310a) and then restart the first pumping system (e.g., 305a) after the filters have been cleaned or replaced. In certain embodiments, the pressure differential, PD1, may be in a range between 10 and 50 psi. In other embodiments, the pressure differential, PD1, may be in a range between 10 and 25 psi. In still other embodiments, the pressure differential, PD1, may be in a range between 25 and 50 psi. One of ordinary skill in the art will recognize that the pressure differential, PD1, may vary based on the type or kind of filtration system used. The control system (e.g., 385) may monitor 680 the pressure differential (PT3-PT4) across the second filtration system (e.g., 310b). If the pressure differential, PD2, exceeds a predetermined threshold (e.g., PT3-PT4>≈15 psi), the control system (e.g., 385) may stop 685 the second pumping system (e.g., 305b) to enable an operator to service the filters of the second filtration system (e.g., 310b) and then restart the second pumping system (e.g., 305b) after the filters have been cleaned or replaced. In certain embodiments, the pressure differential, PD2, may be in a range between 10 and 50 psi. In other embodiments, the pressure differential, PD2, may be in a range between 10 and 25 psi. In still other embodiments, the pressure differential, PD2, may be in a range between 25 and 50 psi. One of ordinary skill in the art will recognize that the pressure differential, PD2, may vary based on the type or kind of filtration system used.

The control system (e.g., 385) may monitor 690 the pressure differential (PT4-PT5) across the third filtration system (e.g., 310c). If the pressure differential, PD3, exceeds a predetermined threshold (e.g., PT4-PT5>≈15 psi), the control system (e.g., 385) may stop 695 the third pumping system (e.g., 305c) to enable an operator to service the filters of the third filtration system (e.g., 310c) and then restart the third pumping system (e.g., 305c) after the filters have been cleaned or replaced. In certain embodiments, the pressure differential, PD3, may be in a range between 10 and 50 psi. In other embodiments, the pressure differential, PD3, may be in a range between 10 and 25 psi. In still other embodiments, the pressure differential, PD3, may be in a range between 25 and 50 psi. One of ordinary skill in the art will recognize that the pressure differential, PD3, may vary based on the type or kind of filtration system used. The control system (e.g., 385) may monitor 697 the pressure differential (PT6-PT7) across the fourth filtration system (e.g., 380). If the pressure differential, PD4, exceeds a predetermined threshold (e.g., PT6-PT7>≈15 psi), the control system (e.g., 385) may stop 699 the third pumping system (e.g., 305c) to enable an operator to service the filters of the fourth filtration system (e.g., 380) and then restart the third pumping system (e.g., 305c) after the filters have been cleaned or replaced. In certain embodiments, the pressure differential, PD4, may be in a range between 10 and 50 psi. In other embodiments, the pressure differential, PD4, may be in a range between 10 and 25 psi. In still other embodiments, the pressure differential, PD4, may be in a range between 25 and 50 psi. One of ordinary skill in the art will recognize that the pressure differential, PD4, may vary based on the type or kind of filtration system used.

Figure 7:
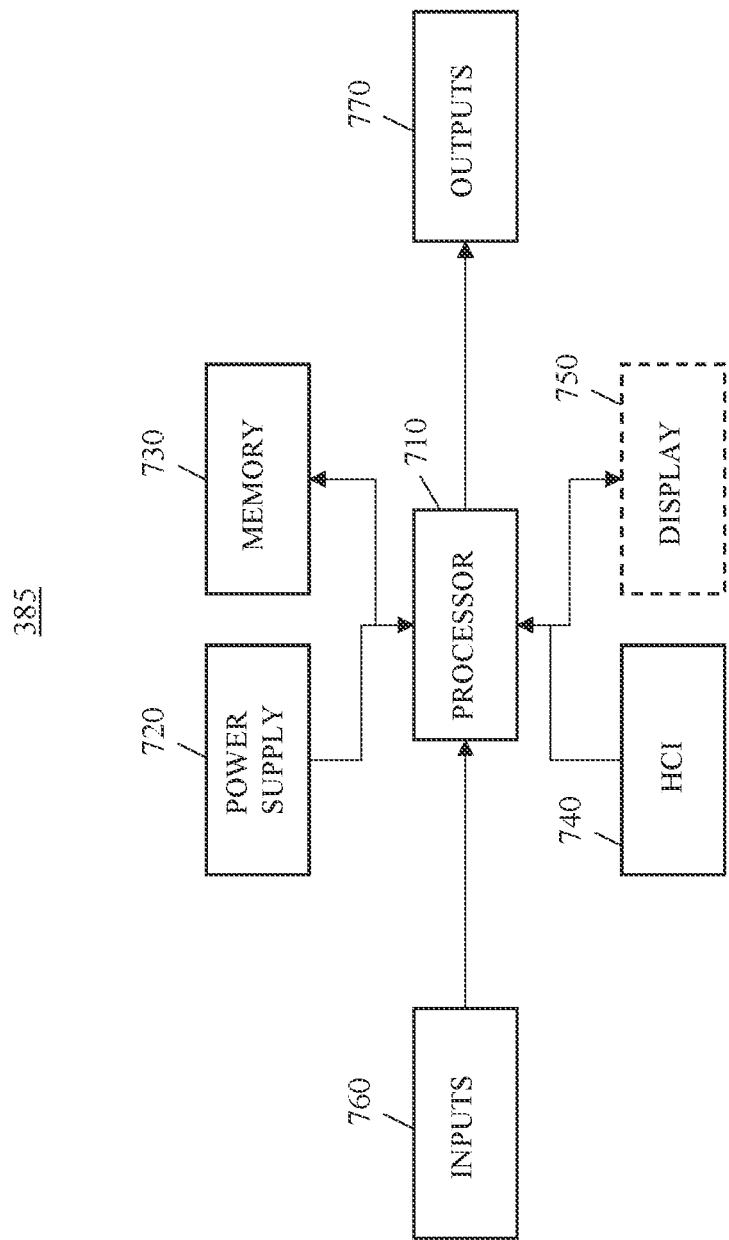
FIG. 7 shows a programmable logic controller ("PLC") based control system of a mobile water filtration system in accordance with one or more embodiments of the present invention.

FIG. 7 shows a programmable logic controller ("PLC") based control system 385 of a mobile water filtration system 200 in accordance with one or more embodiments of the present invention. Control system 385 may be include one or more processing units 710 disposed on one or more printed circuit boards (not shown). Each of the one or more processing units 710 may be a single-core processor (not independently illustrated) or a multi-core processor (not independently illustrated) capable of either executing logical functions or executing software instructions. Multi-core processing units typically include a plurality of processor cores (not shown) disposed on the same physical die (not shown) or a plurality of processor cores (not shown) disposed on multiple die (not shown) that are collectively disposed within the same mechanical package (not shown). Control system 385 may include a power supply 720, system memory 730, one or more optional human-computer interfaces ("HCI") 740, and optionally a display 750. The one or more human-computer interfaces may include an on/off switch (not shown) for the system 200.

Control system 385 may include an input interface 760 that facilitates inputs from a variety of sources including, but not limited to, regulators, meters, gauges, sensors, and transducers such as, for example, data provided by temperature sensor TT1, flow meters FT1, FT2, FT3, and FT4, pressure transducers PT1, PT2, PT3, PT4, PT5, PT6, PT7, and PT8, tank volumes TG1 and TG2, coagulant tank volumes CG1 and CG2, flocculant tank volumes FG1, and the state of valves V1, V2, V3, V4, and V5. The control system 385 may also include an output interface 770 that facilitates outputs used as part of control and automation of the system 200. For example, control system 385 may, through the output interface 770, independently control the state (opened or closed) of valves V1, V2, V3, V4, and V5. In addition, control system 385 may control the pump speeds of the first pumping system (e.g., 305a), the second pumping system (e.g., 305b), and the third pumping system (e.g., 305c), by controlling the amount of air pressure that the air regulators AR1, AR2, and AR3 provide to the first pumping system (e.g., 305a), the second pumping system (e.g., 305b), and the third pumping system (e.g., 305c) respectively. The control system 385 may control the pump speeds of the coagulant pumping system 335 and the flocculant pumping system 340. In addition, control system 385 may, through either the output interface 770 or the HCI 740 or optional display 750, provide a signal to an operator that a pressure differential has exceeded a predetermined threshold and that a particular filtration system (e.g., 310a, 310b, 310c, and 380) requires filter service. One of ordinary skill in the art will appreciate that the control system 385 may be programmed to implement one or more of the methods disclosed herein, thereby enabling automation of the mobile water filtration system 200.

Figure 8:
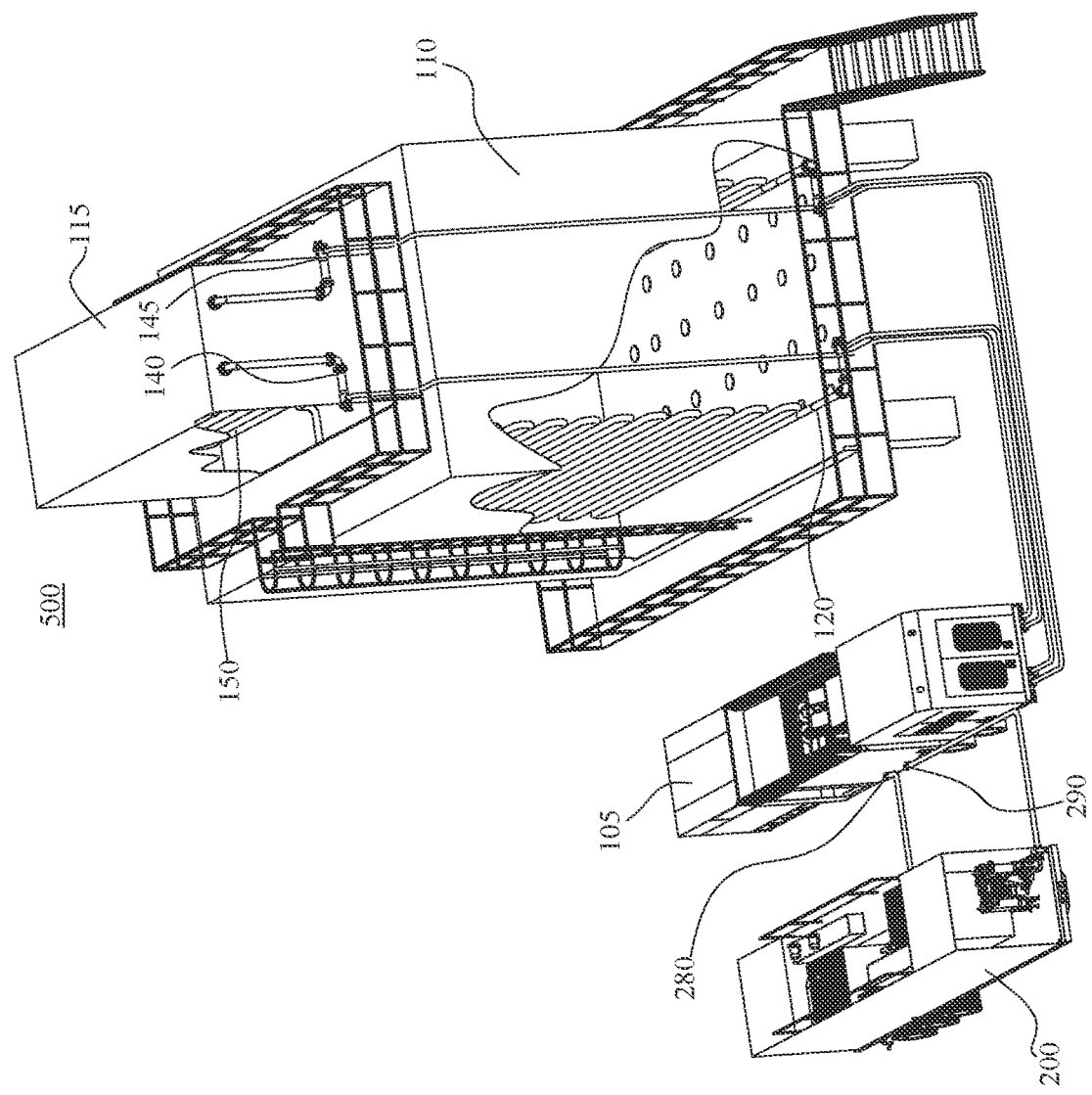
FIG. 8 shows an exemplary application of a mobile water filtration system disposed on-site supporting decoking operations of a fired heater in accordance with one or more embodiments of the present invention.

FIG. 8 shows an exemplary application of a mobile water filtration system 200 disposed on-site supporting decoking operations of a fired heater 100 in accordance with one or more embodiments of the present invention. In the example depicted, a mobile decoking system 105, such as that commercially offered by Cokebusters® USA Inc., of Houston, Tex., may be disposed on-site, one or more pigs (not shown) may be deployed within, and the decoking system may be connected to, the radiant tubes and convection tubes of the tubular coils 130 and 150. Mobile water filtration system 200 may be brought onto the site and at least two connections are required, connecting the inlet connector of the system 200 to wastewater, or dirty water, tank of the decoking system 105 and connecting the outlet connector of system 200 to the clean water tank of the decoking system 105. As the decoking system 105 performs the mechanical decoking operation and fills its wastewater tank, the mobile water filtration system 200 may automatically draw the water out of the tank, filter and treat the coke-laden water, and after processing provide filtered water back to clean water tank of the decoking system 105 for reuse or, if the decoking operation is complete, discharge to a drain or storage.

In one or more embodiments of the present invention, a mobile water filtration system for on-site decoking operations may include a mobile trailer comprising an inlet connector and an outlet connector. An outlet of a dirty water tank of, for example, a mobile decoking system, may fluidly connect to the inlet connector. The outlet connector may fluidly connect to a clean water tank of, for example, the mobile decoking system or an on-site drain. The system may further include a first pumping system, a first filtration system, and a first tank disposed in the mobile trailer, where the inlet connector is fluidly connected to an inlet of the first pumping system, an outlet of the first pumping system is fluidly connected to an inlet of the first filtration system, and an outlet of the first filtration system is fluidly connected to an inlet of the first tank. The system may further include a second pumping system, a second filtration system, and a second tank disposed in the mobile trailer, where an outlet of the first tank is fluidly connected to an inlet of the second pumping system, an outlet of the second pumping system is fluidly connected to an inlet of the second filtration system, and an outlet of the second filtration system is fluidly connected to an inlet of the second tank. The system may further include a third pumping system, a third filtration system, and a fourth filtration system disposed in the mobile trailer, where an outlet of the second tank is fluidly connected to an inlet of the third pumping system, an outlet of the third pumping system is fluidly connected to an inlet of the third filtration system, an outlet of the third filtration system is fluidly connected to an inlet of the fourth filtration system, and an outlet of the fourth filtration system is fluidly connected to the outlet connector. A control system that controls a pump speed of the first pumping system, the second pumping system, and the third pumping system.

In one or more embodiments of the present invention, the system may further include a coagulant tank fluidly connected to a coagulant pumping system, where the control system controls a pump speed of the coagulant pumping system that fluidly communicates coagulant from the coagulant tank to the first tank. The system may further include a flocculant tank fluidly connected to a flocculant pumping system, wherein the control system controls a pump speed of the flocculant pumping system that fluidly communicates flocculant from the flocculant tank to the first tank. In one or more embodiments of the present invention, the system may further include one or more valves that control fluid communication between the first tank and the second pump system, one or more valves that control fluid communication between the second tank and the third pump system, and a valve that controls fluid communication between the fourth filtration system and the water outlet connector. In one or more embodiments of the present invention, the first filtration system may comprise a filter configured to filter particles having a size in a range between 750 microns and 80 microns, the second filtration system may comprise a filter configured to filter particles having a size in a range between 300 microns and 60 microns, the third filtration system comprises a filter configured to filter particles having a size in a range between 150 microns and 40 microns, and the fourth filtration system comprises a filter configured to filter particles having a size smaller than 150 microns or 40 microns.

In one or more embodiments of the present invention, a batch method of mobile water filtration for on-site decoking operations may include fluidly communicating fluids from a wastewater tank of, for example, a mobile decoking system, to an inlet connector of a mobile water filtration system. The method may further include monitoring, with a control system, a fluid volume of a first tank and a fluid volume of a second tank of the mobile water filtration system. If the fluid volume of the first tank is less than a first predetermined volume, the control system may start a first pumping system to fluidly communicate fluids from the inlet connector to the first pumping system, a first filtration system, and the first tank and stopping a second pumping system. If the fluid volume of the first tank reaches a second predetermined volume, the control system may start a coagulant pumping system that fluidly communicates a predetermined volume of coagulant from a coagulant tank into the first tank. If the fluid volume of the first tank reaches a third predetermined volume, the control system may start a flocculant pumping system that fluidly communicates a predetermined volume of flocculant from a flocculant tank into the first tank, pausing for a predetermined amount of time to allow the first tank to settle, and then starting the second pumping system to fluidly communicate fluids from the first tank to a second filtration system and the second tank. If the fluid volume of the second tank reaches a fourth predetermined volume, the control system may start a third pumping system to fluidly communicate fluids from the second tank to a third filtration system, a fourth filtration, and an outlet connector. The outlet connector may be fluidly connected to a clean water tank of, for example, a mobile decoking system or to an on-site drain. If the fluid volume of the second tank reaches a fifth predetermined volume, the control system may stop the second pumping system.

In one or more embodiments of the present invention, the method may further include monitoring a pressure differential across each of the first filtration system, the second filtration system, the third filtration system, and the fourth filtration system. If a pressure differential across any filtration system exceeds a predetermined pressure differential, the control system may stop the pumping system upstream of the filtration system, allowing an operator to change a filter of the filtration system, and then the control system may restart the pumping system upstream of the filtration system. In one or more embodiments of the present invention, the first predetermined volume is smaller than the second predetermined volume, the second predetermined volume is smaller than the third predetermined volume, and the fourth predetermined volume is smaller than the fifth predetermined volume. In certain embodiments, the first filtration system may comprise a filter for particles having a size in a range between 750 microns and 80 microns, the second filtration system comprises a filter for particles having a size in a range between 300 microns and 60 microns, the third filtration system comprises a filter for particles having a size in a range between 150 microns and 40 microns, and the fourth filtration system comprises a filter for particles having a size smaller than 150 microns or 40 microns.

In one or more embodiments of the present invention, a continuous method of mobile water filtration for on-site decoking operations may include fluidly communicating fluids from a wastewater tank of, for example, a mobile decoking system, to an inlet connector of a mobile water filtration system. The method may further include monitoring, with a control system, a fluid volume of a first tank and a fluid volume of a second tank of the mobile water filtration system. If the fluid volume of the first tank is less than a first predetermined volume, the control system may start a first pumping system to fluidly communicate fluids from the inlet connector to the first pumping system, a first filtration system, and the first tank and stopping a second pumping system. If the fluid volume of the first tank reaches a second predetermined volume, the control system may start the second pumping system to fluidly communicate fluids from the first tank to a second filtration system and the second tank. If the fluid volume of the second tank reaches a third predetermined volume, the control system may start a third pumping system to fluidly communicate fluids from the second tank to a third filtration system, a fourth filtration, and an outlet connector. The outlet connector may be fluidly connected to a clean water tank of, for example, a mobile decoking system or to an on-site drain. If the fluid volume of the second tank reaches a fourth predetermined volume, the control system may stop the second pumping system.

In one or more embodiments of the present invention, the method may further include monitoring a pressure differential across each of the first filtration system, the second filtration system, the third filtration system, and the fourth filtration system. If a pressure differential across any filtration system exceeds a predetermined pressure differential, the control system may stop the pumping system upstream of the filtration system, allowing an operator to change a filter of the filtration system, and then the control system may restart the pumping system upstream of the filtration system. In one or more embodiments of the present invention, the first predetermined volume may be smaller than the second predetermined volume and the third predetermined volume may be smaller than the fourth predetermined volume. In certain embodiments, the first filtration system may comprise a filter for particles having a size in a range between 750 microns and 80 microns, the second filtration system comprises a filter for particles having a size in a range between 300 microns and 60 microns, the third filtration system comprises a filter for particles having a size in a range between 150 microns and 40 microns, and the fourth filtration system comprises a filter for particles having a size smaller than 150 microns or 40 microns.

Advantages of one or more embodiments of the present invention may include one or more of the following:

In one or more embodiments of the present invention, a method and system for mobile water filtration enables on-site recycling of wastewater for reuse in, for example, mechanical decoking operations of fired-heaters, furnaces, boilers, or other systems prone to build up of residue or scale.

In one or more embodiments of the present invention, a method and system for mobile water filtration enables on-site disposal of wastewater in a safe and environmentally friendly manner.

In one or more embodiments of the present invention, a method and system for mobile water filtration uses a coagulant, a flocculant, and a plurality of cascaded filters of increasingly fine pitch to treat wastewater and remove coke particulate matter for reuse or safe and environmentally friendly disposal.

In one or more embodiments of the present invention, a method and system for mobile water filtration may be operated in an automated manner such that its use, in for example, combination with a mobile decoking system, does not require human intervention.

In one or more embodiments of the present invention, a method and system for mobile water filtration significantly reduces the volume of source water required for mechanical decoking operations and significantly reduces the volume of wastewater to be disposed of after completion of mechanical decoking operations.

In one or more embodiments of the present invention, a method and system for mobile water filtration reduces or eliminates the need for treatment and disposal of contaminated wastewater. The filtered water may be reused for further use or disposed of in a safe and an environmentally friendly manner.

In one or more embodiments of the present invention, a method and system for mobile water filtration substantially reduces the costs associated with sourcing water and disposal of wastewater generated as part of mechanical decoking operations.

In one or more embodiments of the present invention, a method and system for mobile water filtration substantially reduces or eliminates the risk of fouling the environment.

In one or more embodiments of the present invention, a method and system for mobile water filtration may be used in furnaces that require soda ash passivation while decoking. Soda ash is typically dissolved in the water used for decoking. Since the mobile water filtration unit does not filter out the dissolved soda ash, it is retained for reuse with the recycled water.

In one or more embodiments of the present invention, a method and system for mobile water filtration may be scaled up or down based on the application. For example, in certain embodiments a standard 40-foot trailer may be used, however, in other embodiments a 48-foot or 53-foot trailer may be used. In such embodiments, the equipment, including the tank sizes and the filtration systems, may scale to make productive use of the additional area. In such cases, the predetermined volumes described herein may scale accordingly.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should only be limited by the appended claims.

What is claimed is:

1. A method of mobile water filtration for on-site decoking operations comprising:
   monitoring a fluid volume of a first tank and a fluid volume of a second tank;
   if the fluid volume of the first tank is less than a first predetermined volume, starting a first pumping system to fluidly communicate fluids from an inlet connector to the first pumping system, a first filtration system, and the first tank and stopping a second pumping system;
   if the fluid volume of the first tank reaches a second predetermined volume, fluidly communicating a predetermined volume of coagulant into the first tank;
   if the fluid volume of the first tank reaches a third predetermined volume, fluidly communicating a predetermined volume of flocculant into the first tank, pausing for a predetermined amount of time to allow the first tank to settle, and starting the second pumping system to fluidly communicate fluids from the first tank to a second filtration system and the second tank;
   if the fluid volume of the second tank reaches a fourth predetermined volume, starting a third pumping system to fluidly communicate fluids from the second tank to a third filtration system, a fourth filtration system, and an outlet connector; and
   if the fluid volume of the second tank reaches a fifth predetermined volume, stopping the second pumping system.

2. The method of claim 1, further comprising:
   fluidly communicating fluids from a wastewater tank to the inlet connector.

3. The method of claim 1, further comprising:
   fluidly communicating fluid from the outlet connector to a clean water tank.

4. The method of claim 1, further comprising:
   fluidly communicating fluid from the outlet connector to an on-site drain.

5. The method of claim 1, further comprising:
   monitoring a pressure differential across each of the first filtration system, the second filtration system, the third filtration system, and the fourth filtration system;
   if a pressure differential across any filtration system exceeds a predetermined pressure differential, stopping the pumping system upstream of the filtration system, changing a filter of the filtration system, and restarting the pumping system upstream of the filtration system.

6. The method of claim 1, wherein the first predetermined volume is smaller than the second predetermined volume and the second predetermined volume is smaller than the third predetermined volume.

7. The method of claim 1, wherein the fourth predetermined volume is smaller than the fifth predetermined volume.

8. The method of claim 1, wherein the first filtration system comprises a filter for particles having a size in a range between 750 microns and 80 microns.

9. The method of claim 1, wherein the second filtration system comprises a filter for particles having a size in a range between 300 microns and 60 microns.

10. The method of claim 1, wherein the third filtration system comprises a filter for particles having a size in a range between 150 microns and 40 microns.

11. The method of claim 1, wherein the fourth filtration system comprises a filter for particles having a size smaller than 150 microns or 40 microns.

12. The method of claim 1, wherein a wastewater tank of a decoking system is fluidly connected to the inlet connector and the outlet connector is fluidly connected to a clean water tank of the decoking system.

* * * * *